US012330426B2

(12) United States Patent
Nagashima et al.

(10) Patent No.: US 12,330,426 B2
(45) Date of Patent: Jun. 17, 2025

(54) CARTRIDGE

(71) Applicant: SEIKO EPSON CORPORATION, Tokyo (JP)

(72) Inventors: Takumi Nagashima, Matsumoto (JP); Yoshihiro Koizumi, Shiojiri (JP); Shun Oya, Kiso-gun (JP)

(73) Assignee: SEIKO EPSON CORPORATION, Tokyo (JP)

( * ) Notice: Subject to any disclaimer, the term of this patent is extended or adjusted under 35 U.S.C. 154(b) by 155 days.

(21) Appl. No.: 18/280,623

(22) PCT Filed: Mar. 9, 2022

(86) PCT No.: PCT/JP2022/010222
§ 371 (c)(1),
(2) Date: Sep. 6, 2023

(87) PCT Pub. No.: WO2022/196482
PCT Pub. Date: Sep. 22, 2022

(65) Prior Publication Data

US 2024/0140102 A1 May 2, 2024

(30) Foreign Application Priority Data

Mar. 19, 2021 (JP) ................................ 2021-045568
Jun. 15, 2021 (JP) ................................ 2021-099174
Jan. 27, 2022 (JP) ................................ 2022-010594

(51) Int. Cl.
*B41J 2/175* (2006.01)

(52) U.S. Cl.
CPC ......... *B41J 2/17553* (2013.01); *B41J 2/1752* (2013.01)

(58) Field of Classification Search
CPC .... B41J 2/175; B41J 2/17506; B41J 2/17509; B41J 2/1752; B41J 2/17523
See application file for complete search history.

(56) References Cited

U.S. PATENT DOCUMENTS 5,557,310 A 9/1996 Kurata et al.
5,949,459 A * 9/1999 Gasvoda ................ B41J 2/1752 347/86

(Continued)

FOREIGN PATENT DOCUMENTS

JP H03-136861 A 6/1991
JP H10-95130 A 4/1998

(Continued)

OTHER PUBLICATIONS

May 24, 2022 International Search Report issued in International Application No. PCT/JP2022/010222.

*Primary Examiner* — Anh T Vo
(74) *Attorney, Agent, or Firm* — Oliff PLC

(57) ABSTRACT

A cartridge includes a first operation surface that receives a first load for moving the cartridge in an inserting direction, a main surface that constitutes a top surface positioned on a side of an upward direction in a direction of gravity in an inserted posture, a second operation surface that constitutes the top surface in an inserted posture and is positioned on a side of a downward direction in the direction of gravity with respect to the main surface and that receives a second load for moving the cartridge in a rotational-attachment direction, in which an angle formed by the second operation surface and the inserting direction is smaller than an angle formed by the first operation surface and the inserting direction.

9 Claims, 13 Drawing Sheets

(56) References Cited

U.S. PATENT DOCUMENTS

| | | | | | |
|---|---|---|---|---|---|
| 6,086,192 | A | 7/2000 | Kurata et al. | | |
| 6,305,794 | B1 | 10/2001 | Sasaki et al. | | |
| 6,412,931 | B1 | 7/2002 | Kurata et al. | | |
| 7,178,911 | B2 * | 2/2007 | Katayama | B41J 2/17513 | 347/86 |
| 8,297,738 | B1 * | 10/2012 | Kodama | B41J 2/17546 | 347/49 |
| 8,646,889 | B2 | 2/2014 | Aoki et al. | | |
| 2002/0149655 | A1 | 10/2002 | Kurata et al. | | |
| 2004/0210424 | A1 | 10/2004 | Seino et al. | | |
| 2008/0036828 | A1 | 2/2008 | Koike et al. | | |
| 2015/0343770 | A1 * | 12/2015 | Seki | B41J 2/1752 | 347/50 |
| 2016/0052283 | A1 * | 2/2016 | Kimura | B41J 2/17523 | 347/85 |
| 2019/0118543 | A1 | 4/2019 | Smith et al. | | |
| 2020/0070532 | A1 | 3/2020 | Osakabe et al. | | |
| 2020/0269586 | A1 | 8/2020 | Ishizawa et al. | | |
| 2021/0031535 | A1 | 2/2021 | Wang et al. | | |

FOREIGN PATENT DOCUMENTS

| | | | |
|---|---|---|---|
| JP | 2007-283557 | A | 11/2007 |
| JP | 2012-140011 | A | 7/2012 |
| JP | 2020-032695 | A | 3/2020 |

* cited by examiner

CARTRIDGE

TECHNICAL FIELD

The present disclosure relates to a technique of a cartridge.

BACKGROUND ART

A technique, in the related art, in which a cartridge is moved in a horizontal attachment direction to attach the cartridge to a cartridge attachment section of a printing apparatus is known (Patent Literature 1).

CITATION LIST

Patent Literature

PTL 1: Japanese Unexamined Patent Application Publication No. 2012-140011

SUMMARY OF INVENTION

Technical Problem

In the technique in the related art, a user pushes, in an attachment direction, a back surface of a cartridge on a front side and thereby applies a load to the cartridge to move the cartridge in the attachment direction. Here, depending on the type of printing apparatus, when attaching the cartridge to the cartridge attachment section, it may be necessary to move the cartridge in a plurality of directions to complete attachment. In this case, when a load is applied to the cartridge to displace the cartridge in a plurality of directions, the applied load is distributed, which may degrade operability of the attachment process. Moreover, when the cartridge has a larger outer shape, operability of the process of attaching or detaching the cartridge to or from the printing apparatus may be degraded.

Solution to Problem (1) According to a first aspect of the disclosure, a cartridge detachably attached to a cartridge attachment section of a printing apparatus is provided. The cartridge includes a first operation surface that is positioned on a front side in an inserting direction which extends in a horizontal direction and in which the cartridge is inserted into the cartridge attachment section in an inserted posture in which the cartridge is inserted into the cartridge attachment section, the first operation surface being pushed in the inserting direction to receive a first load for moving the cartridge in the inserting direction, a main surface that constitutes a top surface positioned on a side of an upward direction in a direction of gravity in the inserted posture, and a second operation surface that constitutes the top surface in the inserted posture and is positioned on a side of a downward direction in the direction of gravity with respect to the main surface, the second operation surface being pushed in the downward direction in the direction of gravity to receive a second load for moving the cartridge in a rotational-attachment direction having a component in the downward direction in the direction of gravity, in which, in side view in which the cartridge is viewed in a width direction orthogonal to the inserting direction and the downward direction in the direction of gravity in the inserted posture, an angle formed by the second operation surface and the inserting direction is smaller than an angle formed by the first operation surface and the inserting direction.

(2) According to a second aspect of the disclosure, according to a second aspect of the disclosure, a cartridge detachably attached to a cartridge attachment section of a printing apparatus is provided. The cartridge includes a liquid containing section that stores a liquid, a liquid supply section that communicates with the liquid containing section and includes a central axis, a front surface positioned on a back side in an inserting direction in which the cartridge is inserted into the cartridge attachment section at a predetermined position of the cartridge attachment section and which is orthogonal to a central axis direction extending along the central axis, a first operation surface that is opposite to the front surface in the inserting direction and receives a first load for moving the cartridge in the inserting direction, a bottom surface that includes an insertion opening into which a liquid introducing section of the cartridge attachment section is inserted and that is positioned on a back side in a rotational-attachment direction with a back side of the cartridge attachment section in the inserting direction as a rotation fulcrum, the rotational-attachment direction having a component in a downward direction in a direction of gravity, and a top surface that is opposite to the bottom surface in the central axis direction and couples the front surface and the first operation surface, in which the top surface includes a main surface that extends from the front surface in a detaching direction opposite to the inserting direction and a second operation surface that is positioned on a side of the bottom surface with respect to the main surface and receives a second load for moving the cartridge in the rotational-attachment direction, the second load being generated when the second operation surface is pushed in the downward direction in the direction of gravity, and in side view in which the cartridge is viewed in a width direction orthogonal to the inserting direction and the downward direction in the direction of gravity in an inserted posture in which the cartridge is inserted into the cartridge attachment section, an angle formed by the second operation surface and the inserting direction is smaller than an angle formed by the one operation surface and the inserting direction.

(3) According to a third aspect of the disclosure, a cartridge detachably attached to a cartridge attachment section of a printing apparatus is provided. Attachment of the cartridge to the cartridge attachment section is completed when the cartridge is moved in an inserting direction, which extends in a horizontal direction, to be inserted into the cartridge attachment section at a predetermined position of the cartridge attachment section and is then rotationally moved in a rotational-attachment direction with a back side of the cartridge attachment section in the inserting direction as a rotation fulcrum, the rotational-attachment direction having a component in a downward direction in a direction of gravity. The cartridge includes a first operation surface that is positioned on a front side in the inserting direction in an inserted posture in which the cartridge is inserted into the cartridge attachment section and that is pushed in the inserting direction to receive a first load for moving the cartridge in the inserting direction, a second operation surface that is positioned on a front side in the rotational-attachment direction in the inserted posture and pushed in the downward direction in the direction of gravity to receive a second load for moving the cartridge in the rotational-attachment direction, and an inclined surface that is positioned on a front side in the rotational-attachment direction in the inserted posture, is inclined with respect to the inserting direction so as to be positioned inward toward the second operation surface, and is coupled to the second operation surface, and in side view in which the cartridge is viewed in a width direction orthogonal to the inserting direction and the downward direction in the direction of gravity in the inserted posture, a first angle formed by the second operation surface and the inserting direction is smaller than a second angle formed by the inclined surface and the inserting direction.

DESCRIPTION OF EMBODIMENTS

A. Embodiment

A-1. Configuration of Printing System

Figure 1:
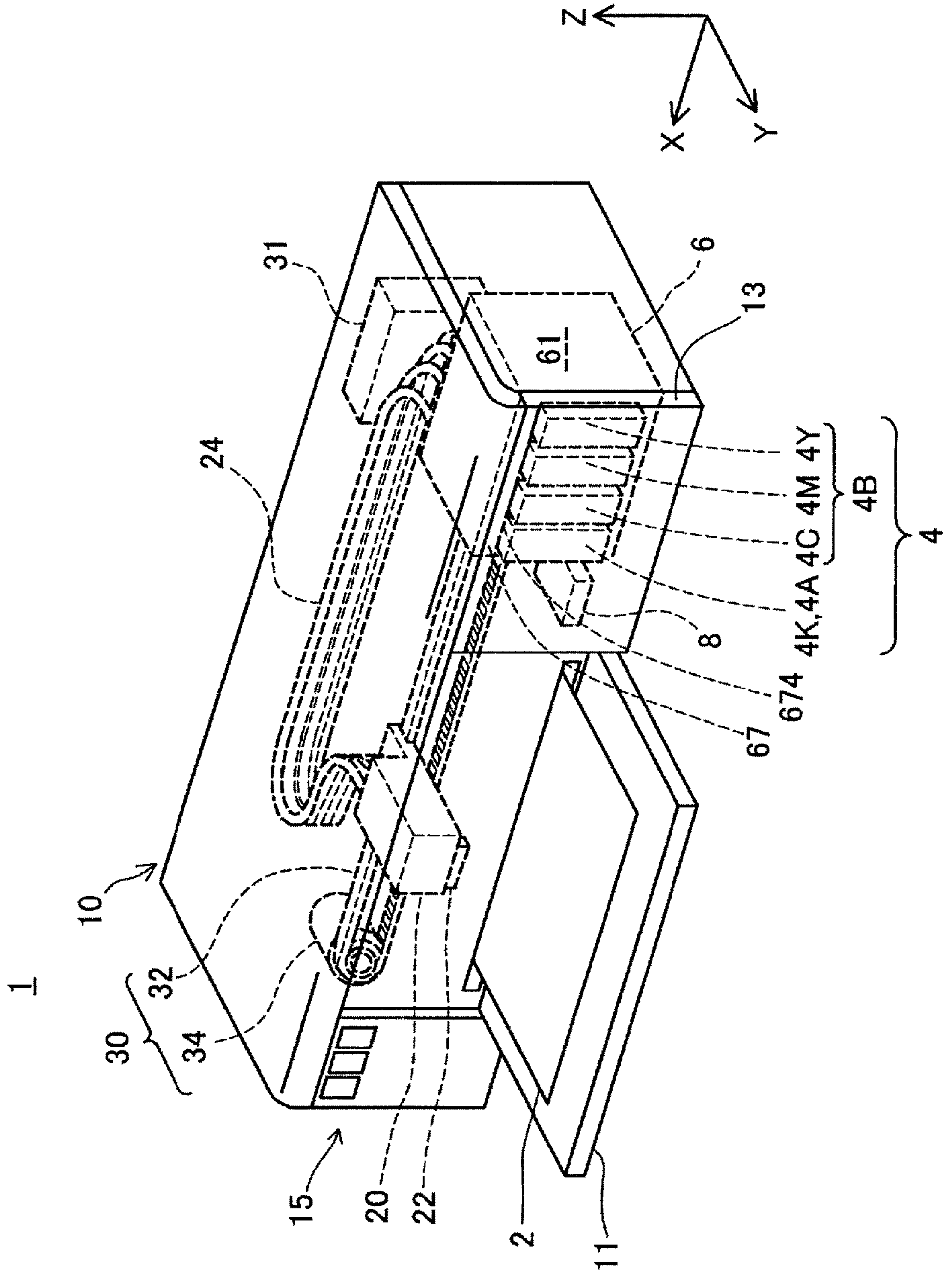
FIG. 1 is a perspective view illustrating a configuration of a printing system as an embodiment of the disclosure.

FIG. 1 is a perspective view illustrating a configuration of a printing system 1 as an embodiment of the disclosure. The XYZ axes, which are three spatial axes orthogonal to each other, are indicated in FIG. 1. Directions indicated by the arrows of the X-axis, the Y-axis, and the Z-axis indicate positive directions extending along the X-axis, the Y-axis, and the Z-axis, respectively. The positive directions extending along the X-axis, the Y-axis, and the Z-axis are referred to as the +X direction, the +Y direction, and the +Z direction, respectively. Directions opposite to the directions indicated by the arrows of the X-axis, the Y-axis, and the Z-axis are negative directions extending along the X-axis, the Y-axis, and the Z-axis, respectively. The negative directions extending along the X-axis, the Y-axis, and the Z-axis are referred to as the −X direction, the −Y direction, and the −Z direction, respectively. Directions that extend along the X-axis, the Y-axis, and the Z-axis regardless of whether being positive or negative are referred to as the X direction, the Y direction, and the Z direction, respectively. The same is applicable to the drawings and description below.

The printing system 1 includes a printing apparatus 10 and a cartridge 4 that supplies ink, which is a liquid, to the printing apparatus 10.

The printing apparatus 10 of the present embodiment is an ink jet printer that ejects the ink as liquid from an ejecting head 22. The printing apparatus 10 is a large-format printer that performs printing on large sheets (for example, A2- to A0-sized sheets), such as posters. The printing apparatus 10 includes a cartridge attachment section 6, a control section 31, a carriage 20, the ejecting head 22, and a driving mechanism 30. Moreover, the printing apparatus 10 includes an operation button 15 used by a user to operate the printing apparatus 10.

The cartridge attachment section 6 includes a first apparatus wall 67 positioned on the +Y direction side. The first apparatus wall 67 includes an insertion/removal opening 674 serving as an entrance/exit of an accommodating chamber 61 for the cartridge 4. The cartridge 4 is accommodated in or removed from the accommodating chamber 61 of the cartridge attachment section 6 via the insertion/removal opening 674. A plurality of cartridges 4 are each detachably attached to the cartridge attachment section 6. In the present embodiment, four types of cartridges 4 which correspond to ink of four colors of black, yellow, magenta, and cyan, that is, a total of four cartridges 4, are attached to the cartridge attachment section 6. The cartridge 4 that stores black ink is referred to as a cartridge 4K, the cartridge 4 that stores yellow ink is referred to as a cartridge 4Y, the cartridge 4 that stores magenta ink is referred to as a cartridge 4M, and the cartridge 4 that stores cyan ink is referred to as a cartridge 4C. In the present embodiment, the cartridge 4K is configured to be able to store more liquid than the cartridges 4C, 4M, and 4Y. Accordingly, the cartridge 4K is also referred to as a first-type cartridge 4A, and each of the cartridges 4C, 4M, and 4Y is also referred to as a second-type cartridge 4B.

The printing apparatus 10 includes a cover for replacement 13 on the front surface on the +Y direction side. The cover for replacement 13 is configured to be openable/closable. Opening the cover for replacement 13 exposes the opening of the cartridge attachment section 6 and enables the cartridge 4 to be attached/detached. When the cartridge 4 is attached to the cartridge attachment section 6, ink is able to be supplied to the ejecting head 22, which is provided in the carriage 20, via a tube 24 serving as a liquid flowing tube. In the present embodiment, the ink is supplied to the ejecting head 22 from the cartridge 4 by using a water head difference. Specifically, the water head difference between a liquid level of the ink in the cartridge attachment section 6 and the ejecting head 22 causes the ink to be supplied to the ejecting head 22. Note that, in other embodiments, the ink may be supplied to the ejecting head 22 when the ink in the cartridge 4 is sucked by a non-illustrated pump mechanism of the printing apparatus 10. Note that the tube 24 is provided for each type of ink. Here, a state in which the cartridge 4 is attached to the cartridge attachment section 6 and in which the ink as liquid is able to be supplied to the printing apparatus 10 is referred to as "the attachment completed state".

Nozzles are provided in the ejecting head 22 for each type of ink. The ejecting head 22 ejects ink from the nozzles onto a printing sheet 2 and prints data such as characters or an image. The printing apparatus 10 of the present embodiment is a printer of a so-called "off-carriage type", in which the cartridge attachment section 6 does not move in accordance with movement of the carriage 20. The technique of the disclosure is also applicable to a printer of a so-called "on-carriage type", in which the cartridge attachment section 6 is provided in the carriage 20 and in which the cartridge attachment section 6 moves together with the carriage 20.

The control section 31 controls the respective sections of the printing apparatus 10 and transmits or receives a signal to or from the cartridge 4. The carriage 20 causes the ejecting head 22 to move relative to the printing sheet 2.

The driving mechanism 30 reciprocates the carriage 20 in accordance with a control signal from the control section 31. The driving mechanism 30 includes a timing belt 32 and a driving motor 34. Power of the driving motor 34 is transferred to the carriage 20 via the timing belt 32, and the carriage 20 is thereby reciprocated in a main scanning direction, which is the X direction. Moreover, the printing apparatus 10 includes a transporting mechanism that moves the printing sheet 2 in a sub-scanning direction, which is the +Y direction. When printing is performed, the transporting mechanism moves the printing sheet 2 in the sub-scanning direction, and the printing sheet 2 on which printing is completed is output onto a front cover 11.

A region called a home position is provided at a position to which the carriage 20 is moved in the main scanning direction and which is outside a printing region, and a maintenance mechanism that performs maintenance to ensure normal printing is mounted at the home position. The maintenance mechanism is constituted by a cap member 8 that is pressed against a surface on which the nozzles are formed on the bottom surface side of the ejecting head 22 and that forms a closed space so as to enclose the nozzles, a non-illustrated raising/lowering mechanism that raises/lowers the cap member 8 so as to press the cap member 8 against the nozzle surface of the ejecting head 22, a non-illustrated suction pump that introduces negative pressure into the enclosed space where the cap member 8 is formed by being pressed against the nozzle surface of the ejecting head 22, and the like.

In the present embodiment, in a use state of the printing system 1, an axis extending in the sub-scanning direction in which the printing sheet 2 is transported is the Y-axis, an axis extending in a downward direction in the direction of gravity is the Z-axis, and an axis extending in a direction in which the carriage 20 moves is the X-axis. Here, "use state of the printing system 1" denotes a state in which the printing system 1 is installed on a horizontal surface. Moreover, in the present embodiment, the sub-scanning direction is the +Y direction, a direction opposite thereto is the −Y direction, a downward direction in the direction of gravity is the −Z direction, and an upward direction against the direction of gravity is the +Z direction. The X direction and the Y direction extend in the horizontal direction. When the printing system 1 is viewed from the front surface side, a direction from the right to the left is the +X direction, and a direction opposite thereto is the −X direction. Further, in the present embodiment, an inserting direction in which the cartridge 4 is inserted into the cartridge attachment section 6 for attachment is the −Y direction, and a direction in which the cartridge 4 is detached from the cartridge attachment section 6 is the +Y direction. Accordingly, in the cartridge attachment section 6, the −Y direction side is also referred to as a back side, and the +Y direction side is also referred to as a front side. In the present embodiment, an arrangement direction of the plurality of cartridges 4 extends in the X direction.

Figure 2:
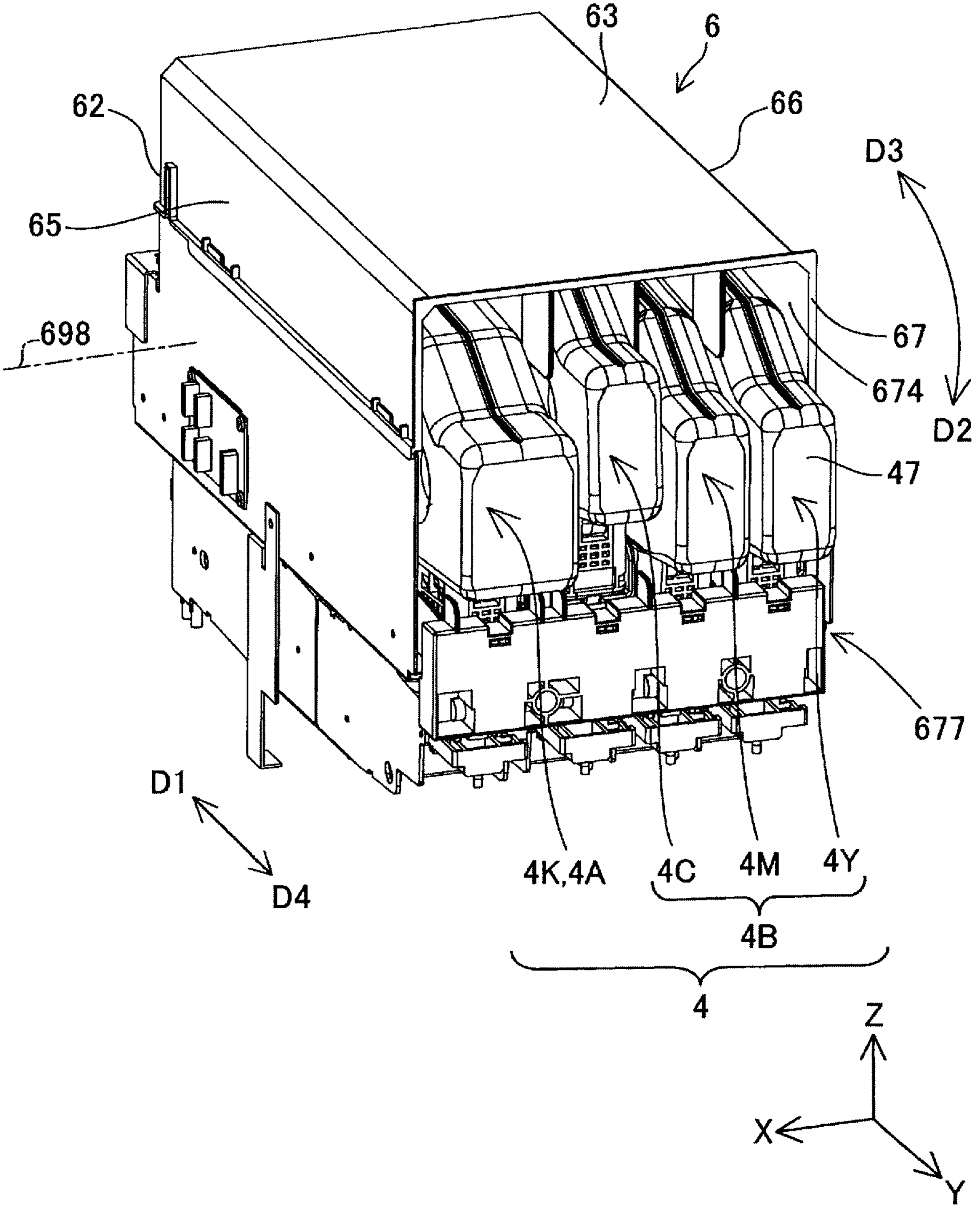
FIG. 2 is a view in which a cartridge is attached to a cartridge attachment section.

FIG. 2 is a view for explaining the cartridge attachment section 6 and the cartridge 4. FIG. 2 illustrates the attachment completed state in which attachment of the cartridges 4K, 4M, and 4Y to the cartridge attachment section 6 is completed. Moreover, FIG. 2 illustrates an insertion completed state in which insertion of the cartridge 4C into the cartridge attachment section 6 is completed.

The cartridge 4 is moved in an inserting direction D1 extending in the horizontal direction to be inserted into the cartridge attachment section 6 at a predetermined position of the cartridge attachment section 6 and is then rotationally moved in a rotational-attachment direction D2, which has a component in the downward direction in the direction of gravity, with the back side of the cartridge attachment section 6 in the inserting direction D1 as a rotation fulcrum 698, thereby completing attachment of the cartridge 4 to the cartridge attachment section 6. Specifically, when the cartridge 4 is attached to the cartridge attachment section 6, an attachment process is performed. The attachment process includes a terminal coupling process and a supply section coupling process performed after the terminal coupling process. The terminal coupling process is a process in which the cartridge 4 is moved in the inserting direction D1 extending in the horizontal direction via the insertion/removal opening 674 of the first apparatus wall 67 and inserted into the accommodating chamber 61 of the cartridge attachment section 6 such that the cartridge 4 is inserted into the cartridge attachment section 6 at a predetermined position. The predetermined position is a position at which contact of a cartridge-side terminal, which will be described below, of the cartridge 4 and an apparatus-side terminal, which will be described below, of the cartridge attachment section 6 is completed. The supply section coupling process is a process in which a liquid introducing section, which will be described below, of the cartridge attachment section 6 and a liquid supply section, which will be described below, of the cartridge 4 are coupled to each other in a state in which the apparatus-side terminal and the cartridge-side terminal are kept in contact with each other. Specifically, in the supply section coupling process, the liquid introducing section and the liquid supply section are coupled to each other by rotationally moving a first operation surface 47 side of the cartridge 4 in the rotational-attachment direction D2, which is indicated by an arrow, about the rotation fulcrum 698 of the cartridge attachment section 6. Note that, in the attachment completed state, an engagement forming body provided on the first apparatus wall 67 side of the cartridge attachment section 6 engages the cartridge 4, and the cartridge 4 thereby retains the attachment completed state.

When the cartridge 4 is detached from the cartridge attachment section 6, the user raises the first operation surface 47 side of the cartridge 4 to thereby rotationally move the rear end 47 side in a coupling terminating direction D3, which is opposite to the rotational-attachment direction D2, with the rotation fulcrum 698 as a fulcrum. The rotational movement terminates the engagement performed by the engagement forming body. When moved in the +Y direction, which corresponds to a detaching direction D4, after rotationally moved in the coupling terminating direction D3 and brought into the attachment completed state, the cartridge 4 is detached from the cartridge attachment section 6.

A-2. Detailed Configuration of Cartridge Attachment Section

Figure 3:
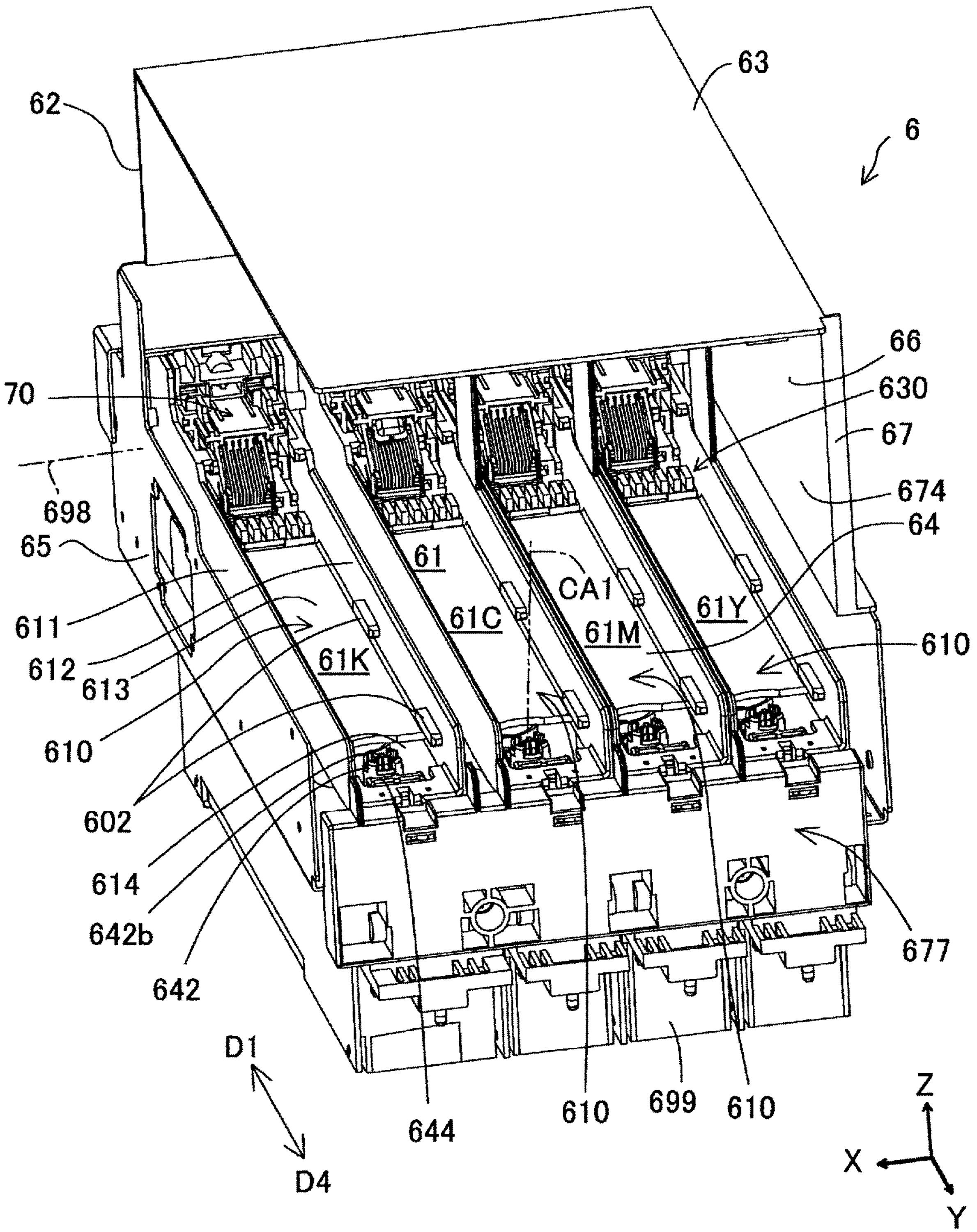
FIG. 3 is a view for explaining the cartridge attachment section and the cartridge.
Figure 4:
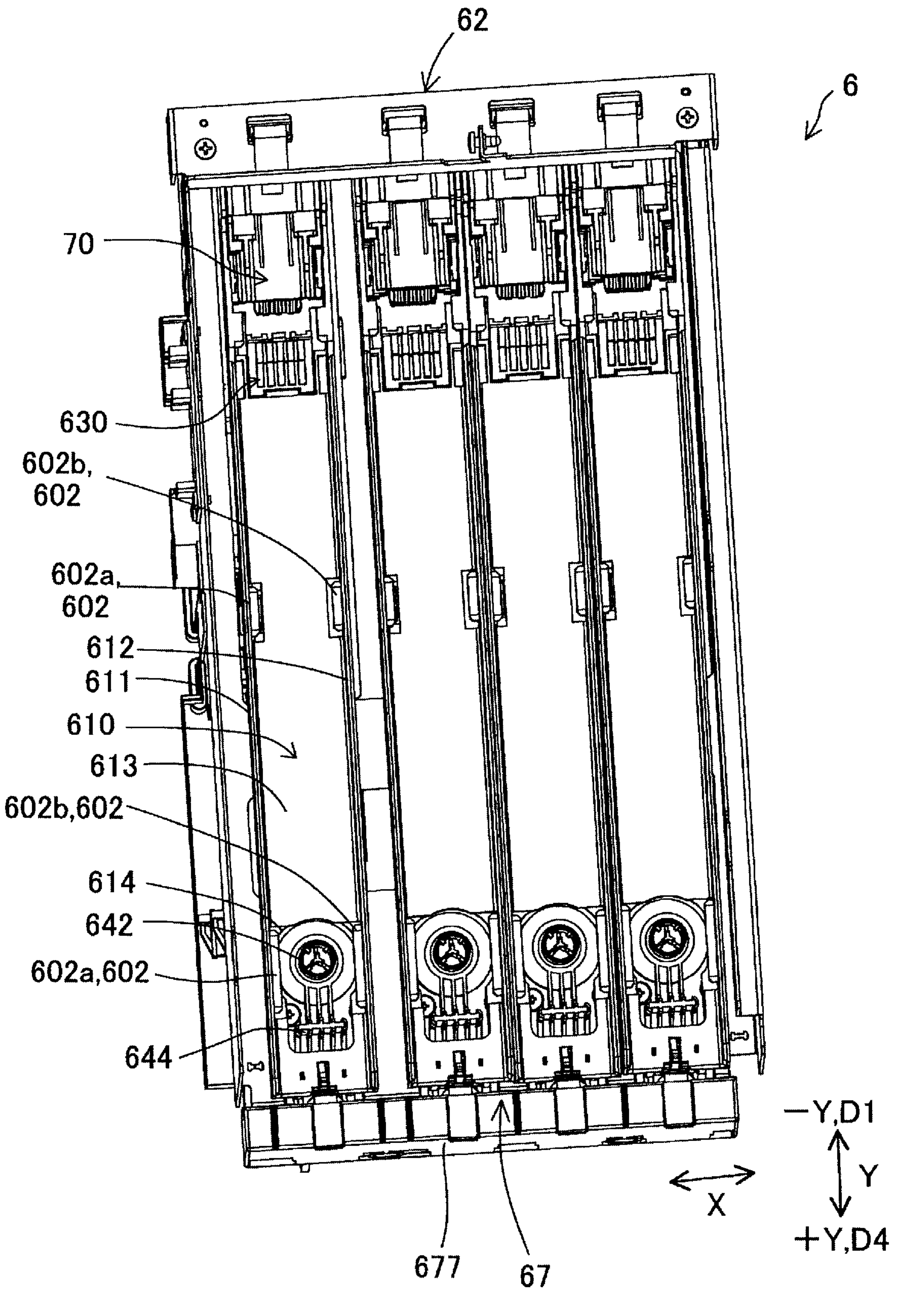
FIG. 4 is a view of the cartridge attachment section viewed from the +Z direction side.

FIG. 3 is a perspective view of the cartridge attachment section 6. FIG. 4 is a view of the cartridge attachment section 6 viewed from the +Z direction side. In FIGS. 3 and 4, for ease of understanding, illustration of the configuration of the cartridge attachment section 6 is partially omitted. Regarding the cartridge attachment section 6, the X direction, the Y direction, and the Z direction are also referred to as a width direction, a depth direction, and a height direction, respectively. In the following description, unless otherwise stated regarding state, each component will be described on the assumption that the cartridge attachment section 6 is in an initial arrangement state in which the cartridge 4 is not attached to the cartridge attachment section 6.

As illustrated in FIG. 3, the cartridge attachment section 6 forms the accommodating chamber 61 that accommodates the cartridge 4. The accommodating chamber 61 has a substantially rectangular parallelepiped shape. In the accommodating chamber 61, shapes of slots 61C, 61M, 61Y, and 61K, which are portions for accommodating the cartridges 4C, 4M, 4Y, and 4K, respectively, substantially correspond to outer shapes of the cartridges 4C, 4M, 4Y, and 4K, respectively. In the present embodiment, the dimension of the cartridge 4K in the X direction is greater than that of each of the other cartridges 4C, 4M, and 4Y such that the amount of liquid to be stored in the cartridge 4K is increased. Accordingly, the width of the slot 61K is greater than the width of each of the other slots 61C, 61M, and 61Y in the present embodiment.

As illustrated in FIG. 3, the cartridge attachment section 6 includes six apparatus walls 62, 63, 64, 65, 66, and 67 that form the accommodating chamber 61. In the disclosure, “wall” conceptually includes a structure constituted by multiple walls in addition to a structure constituted by a single wall. The first apparatus wall 67 forms the insertion/removal opening 674 through which the cartridge 4 is inserted into or removed from the accommodating chamber 61. A second apparatus wall 62 forms a wall of the accommodating chamber 61 on the −Y direction side. The second apparatus wall 62 faces the first apparatus wall 67 in the Y direction. The second apparatus wall 62 is substantially vertical in a use state of the printing apparatus 10.

An apparatus top wall 63 forms a wall of the accommodating chamber 61 on the +Z direction side. An apparatus bottom wall 64 faces the apparatus top wall 63 in the Z direction and forms a wall of the accommodating chamber 61 on the −Z direction side. The apparatus bottom wall 64 is formed of a supporting member 610. The apparatus bottom wall 64 includes a plurality of apparatus openings 614. In the present embodiment, four apparatus openings 614 are formed so as to correspond to the slots 61C, 61M, 61Y, and 61K. The apparatus top wall 63 and the apparatus bottom wall 64 intersect the second apparatus wall 62 and the first apparatus wall 67. In the disclosure, “cross” and “intersect” denote any of the following states: (i) a state in which two components intersect each other and actually cross each other; (ii) a state in which, when one of two components is extended, one component crosses the other component; and (iii) a state in which, when two components are extended, both components cross each other.

A first apparatus side wall 65 forms a wall of the accommodating chamber 61 on the +X direction side. A second apparatus side wall 66 faces the first apparatus side wall 65 in the X direction and forms a wall of the accommodating chamber 61 on the −X direction side. The first apparatus side wall 65 and the second apparatus side wall 66 intersect the second apparatus wall 62, the first apparatus wall 67, the apparatus top wall 63, and the apparatus bottom wall 64.

As illustrated in FIGS. 3 and 4, the cartridge attachment section 6 further includes the supporting member 610, a liquid introducing section 642, an apparatus-side supply section positioning section 644, an apparatus guiding section 602, and an engagement forming body 677. A plurality of supporting members 610 are provided so as to correspond to the number of cartridges 4 to be attached. In the present embodiment, four supporting members 610 are provided. The supporting member 610 forms the apparatus bottom wall 64 of the accommodating chamber 61 on the downward direction side in the direction of gravity. The supporting member 610 supports the cartridge 4 from the −Z direction side, which is the downward direction side in the direction of gravity. The supporting member 610 is a member extending in the Y direction. The supporting member 610 has a recessed shape. The supporting member 610 includes a main wall 613 forming the apparatus bottom wall 64, a first supporting side wall 611, and a second supporting side wall 612.

The main wall 613 forms a recessed bottom portion positioned on the downward direction side in the direction of gravity. An apparatus opening 614 is formed in an end of the main wall 613 on the first apparatus wall 67 side. The apparatus opening 614 passes through the main wall 613 in the thickness direction of the main wall 613.

As illustrated in FIG. 3, the first supporting side wall 611 stands upright in the +Z direction, which is the upward direction against the direction of gravity, from an end of the main wall 613 on the +X direction side. The second supporting side wall 612 stands upright in the +Z direction from an end of the main wall 613 on the −X direction side. The first supporting side wall 611 and the second supporting side wall 612 face each other in the X direction.

The apparatus guiding section 602 guides the cartridge 4 in the inserting direction D1 or the detaching direction D4. The apparatus guiding section 602 is provided for each of the supporting members 610. The apparatus guiding section 602 is provided in each of the first supporting side wall 611 and the second supporting side wall 612. The apparatus guiding section 602 is a protrusion provided in each of the first supporting side wall 611 and the second supporting side wall 612. As illustrated in FIG. 4, a first apparatus guiding section 602*a* provided in the first supporting side wall 611 is a protrusion protruding from the first supporting side wall 611 toward the second supporting side wall 612. The first apparatus guiding section 602*a* extends in the Y direction. Moreover, a plurality of first apparatus guiding sections 602*a* are arranged with a gap therebetween in the Y direction. A second apparatus guiding section 602*b* provided in the second supporting side wall 612 is a protrusion protruding from the second supporting side wall 612 toward the first supporting side wall 611. The second apparatus guiding section 602*b* extends in the Y direction. Moreover, a plurality of second apparatus guiding sections 602*b* are arranged with a gap therebetween in the Y direction.

As illustrated in FIGS. 3 and 4, the liquid introducing section 642 receives the liquid of the cartridge 4. As illustrated in FIG. 3, the liquid introducing section 642 has a central axis CA1. In the present embodiment, the central axis CA1 is inclined 4° in the +Y direction with respect to the Z direction. In the initial arrangement state of the cartridge attachment section 6, the liquid introducing section 642 is positioned not in the accommodating chamber 61 but on the −Z direction side with respect to the accommodating chamber 61. That is, the liquid introducing section 642 is positioned opposite the supporting member 610 with the accommodating chamber 61 therebetween. Accordingly, when the cartridge 4 is inserted into the accommodating chamber 61 of the cartridge attachment section 6, it is possible to prevent the cartridge 4 from coming into contact with the liquid introducing section 642. When the supporting member 610 is rotationally moved in the rotational-attachment direction D2 about the rotation fulcrum 698 to push the apparatus opening 614 down, a tip end 642*b* of the liquid introducing section 642 is arranged in the accommodating chamber 61. That is, the supporting member 610 is rotationally moved about the rotation fulcrum 698 to thereby move the apparatus opening 614 to the downward direction side in the direction of gravity such that the tip end 642*b* of the liquid introducing section 642 is arranged in the accommodating chamber 61 through the apparatus opening 614.

When received by a below-described supply section positioning section of the cartridge 4, the apparatus-side supply section positioning section 644 illustrated in FIG. 3 regulates movement of the liquid supply section of the cartridge 4 with respect to the liquid introducing section 642. The liquid supply section of the cartridge 4 is thus positioned. In the initial arrangement state of the cartridge attachment section 6, the apparatus-side supply section positioning section 644 is positioned not in the accommodating chamber 61 but on the −Z direction side with respect to the accommodating chamber 61. That is, the apparatus-side supply section positioning section 644 is positioned opposite the supporting member 610 with the accommodating chamber 61 therebetween. Accordingly, when the cartridge 4 is inserted into the accommodating chamber 61 of the cartridge attachment section 6, it is possible to prevent the cartridge 4 from coming into contact with the apparatus-side supply section positioning section 644. When the supporting member 610 is rotated in the rotational-attachment direction D2 about the rotation fulcrum 698 to push the apparatus opening 614 down, the other end 644*b* of the apparatus-side supply section positioning section 644 is arranged in the accommodating chamber 61. That is, the supporting member 610 is rotated about the rotation fulcrum 698 to thereby move the apparatus opening 614 such that the other end 644*b* of the apparatus-side supply section positioning section 644 is arranged in the accommodating chamber 61 through the apparatus opening 614.

As illustrated in FIG. 4, the cartridge attachment section 6 further includes an apparatus-side terminal section 70. The apparatus-side terminal section 70 includes an apparatus-side terminal that comes into contact with the cartridge-side terminal of the cartridge 4 when the cartridge 4 is in the attachment completed state.

As illustrated in FIG. 4, the engagement forming body 677 is formed on the +Y direction side with respect to the supporting member 610. Moreover, the engagement forming body 677 is positioned on the −Z direction side with respect to the insertion/removal opening 674. Four non-illustrated elastic attachment engagement sections corresponding to the slots 61C to 61K are arranged in the engagement forming body 677.

A-3. Detailed Configuration of Cartridge

Figure 5:
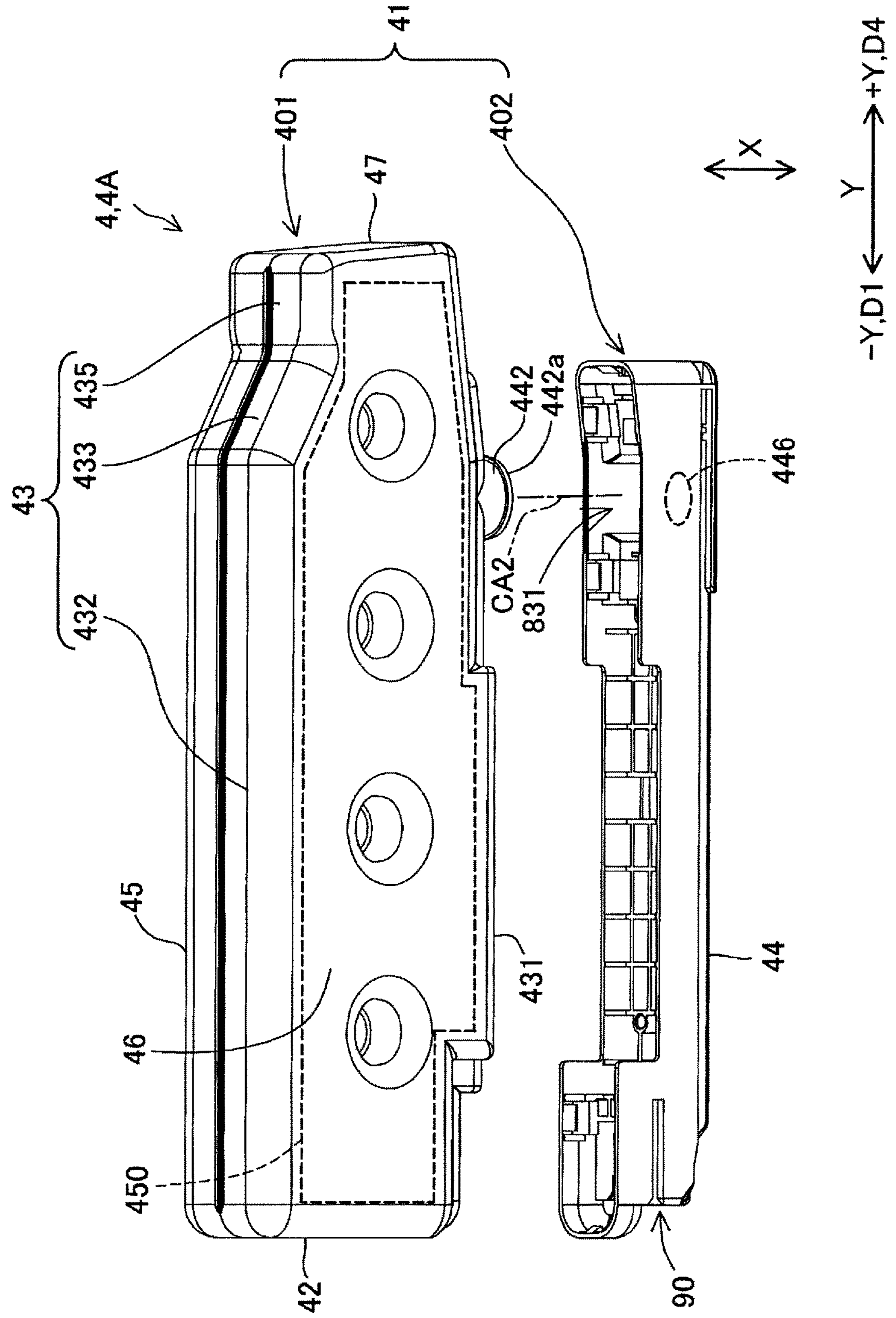
FIG. 5 is an exploded perspective view of a first-type cartridge.
Figure 6:
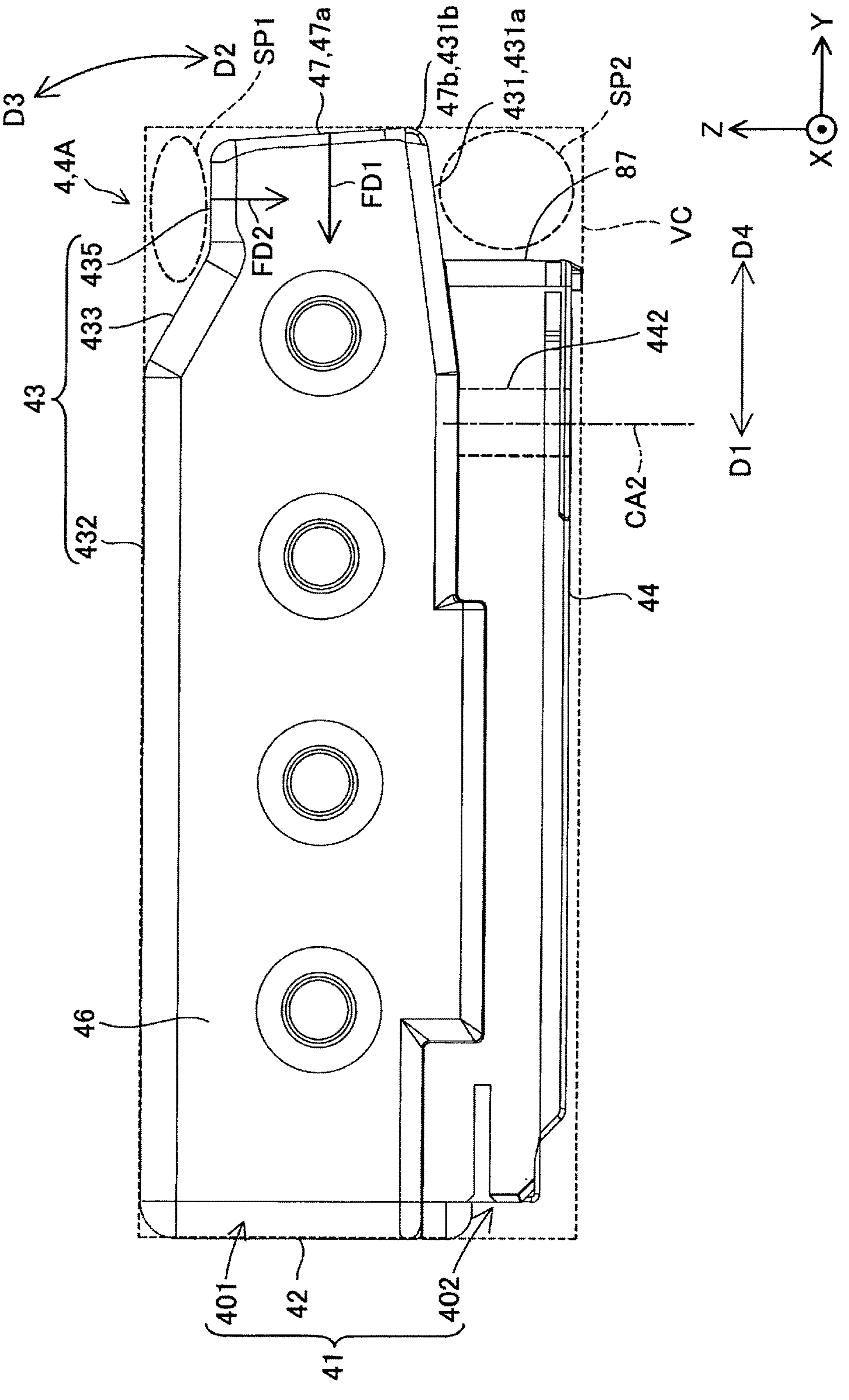
FIG. 6 is a side view of the first-type cartridge.
Figure 7:
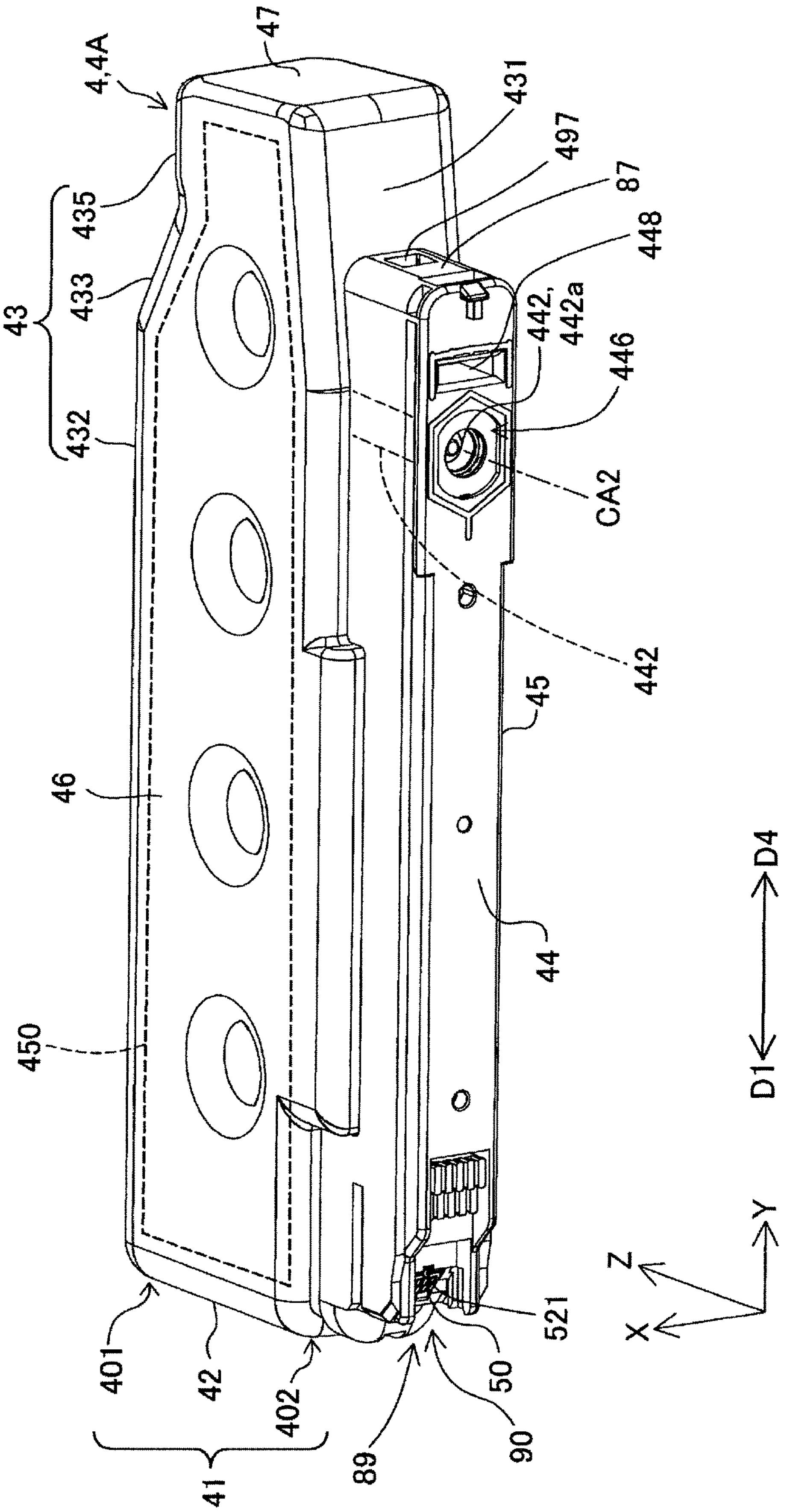
FIG. 7 is a perspective view of the first-type cartridge.
Figure 8:
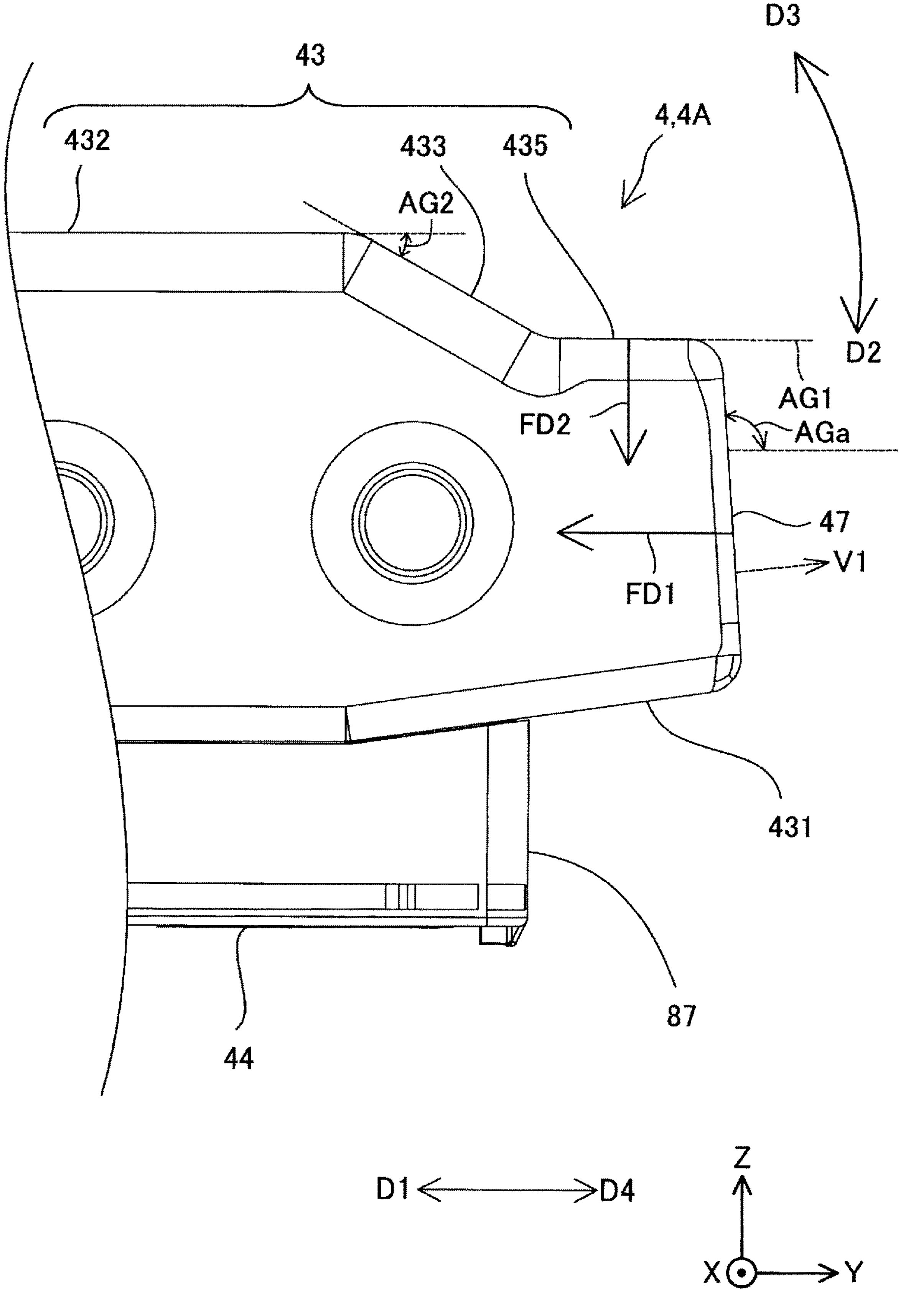
FIG. 8 is a view illustrating a portion of the first-type cartridge.

FIG. 5 is an exploded perspective view of a first-type cartridge 4A. FIG. 6 is a side view of the first-type cartridge 4A. FIG. 7 is a perspective view of the first-type cartridge 4A. FIG. 8 is a view illustrating a portion of the first-type cartridge 4A. The X, Y, and Z axes illustrated in FIGS. 5 to 8 are based on an inserted posture in which the cartridge 4 is inserted into the cartridge attachment section 6. The inserted posture is the same as a posture of the cartridge 4 in an insertion completed state in which insertion into the cartridge attachment section 6 is completed. The first-type cartridge 4A differs from a second-type cartridge 4B in a width of a liquid containing body 401. A difference is that the first-type cartridge 4A is wider than the second-type cartridge 4B. Thus, the volume of a liquid containing section 450 of the first-type cartridge 4A is greater than the volume of a liquid containing section 450 of the second-type cartridge 4B. In another configuration, since the first-type cartridge 4A has a similar configuration to that of the second-type cartridge 4B, the configuration of the cartridge 4 will be described below with reference to illustration of the first-type cartridge 4A.

As illustrated in FIG. 7, the outer shape of the cartridge 4 is a substantially rectangular parallelepiped. In the cartridge 4, a direction extending in the −Y direction corresponding to the inserting direction D1, in which the cartridge 4 is inserted into the cartridge attachment section 6, is a long-side direction, the X direction is a short-side direction corresponding to the width direction, and the Z direction is the downward direction in the direction of gravity, that is, a height direction. The cartridge 4 has the longest dimension in the long-side direction and has the shortest dimension in the short-side direction. The width direction is a direction orthogonal to the inserting direction D1 and the downward direction in the direction of gravity in the inserted posture.

As illustrated in FIG. 7, the cartridge 4 includes a cartridge main body 41 that forms the contour and a circuit substrate 50 attached to the cartridge main body 41. In the present embodiment, the cartridge main body 41 is constituted by two members as illustrated in FIG. 5. Specifically, the cartridge main body 41 includes the liquid containing body 401 and an adaptor 402 fit to the liquid containing body 401 to be attached thereto. Note that, in other embodiments, the cartridge main body 41 may be an integrated component.

Each of the liquid containing body 401 and the adaptor 402 is molded by, for example, injection molding with a synthetic resin, such as polypropylene. The liquid containing body 401 and the adaptor 402 may be formed of the same material or different materials.

The liquid containing body 401 includes the liquid containing section 450, in which ink as liquid is stored, and a liquid supply section 442. The liquid supply section 442 communicates with the liquid containing section 450. The liquid supply section 442 is a member extending from the bottom surface of the liquid containing body 401 and has a central axis CA2. The central axis CA2 is parallel to the Z direction in the insertion completed state. A direction extending along the central axis CA2 is also referred to as a central axis direction. The inserting direction D1 is orthogonal to the central axis direction extending along the central axis CA2.

The adaptor 402 is attached to the bottom surface side of the liquid containing body 401. The adaptor 402 includes a supply section arrangement section that accommodates the liquid supply section 442 and has a recessed shape. An insertion opening 446 is formed on the bottom surface of the supply section arrangement section. The insertion opening 446 is a portion into which the liquid introducing section 642 is inserted. The insertion opening 446 faces a supply section tip end 442*a* serving as a tip end opening of the liquid supply section 442 in the Z direction.

As illustrated in FIG. 7, the cartridge main body 41 includes a front surface 42, the first operation surface 47 as a rear surface, a top surface 43, a bottom surface 44, a first side surface 45, a second side surface 46, and a corner section 89. The surfaces 42, 43, 44, 45, 46, and 47 are also referred to as walls 42, 43, 44, 45, 46, and 47, respectively.

The front surface 42 and the first operation surface 47 face each other in the Y direction extending in the inserting direction D1 in the inserted posture. In the inserted posture, the front surface 42 forms a tip end surface on the −Y direction side, which corresponds to a back side in the inserting direction D1, that is, the tip end side in the inserting direction D1. In the inserted posture, the first operation surface 47 forms a surface positioned on the front side in the inserting direction D1, that is, on the +Y direction side, which corresponds to the detaching direction D4 in which the cartridge 4 is detached from the cartridge attachment section 6. As illustrated in FIG. 6, when the cartridge 4 is inserted into the cartridge attachment section 6, the user pushes the first operation surface 47 in the inserting direction D1 such that the first operation surface 47 receives a first load FD1 for moving the cartridge 4 in the inserting direction D1. The first load FD1 is a force for moving the cartridge 4 in the inserting direction D1. The first operation surface 47 extends from an end of the top surface 43 on the +Y direction side, that is, an end of a second operation surface 435, which will be described below, on the +Y direction side, to a side where the bottom surface 44 is located. The first operation surface 47 has a planar shape. In the present embodiment, "planar shape" conceptually includes not only a plane having no roughness but also a planar surface having slight roughness. As illustrated in FIG. 8, the first operation surface 47 is substantially perpendicular to the inserting direction D1 in the inserted posture and in side view in the width direction. In the present embodiment, an angle AGa formed by the first operation surface 47 and the inserting direction D1 in the inserted posture and in side view in the width direction is 86°±2°. That is, an angle formed by a direction of a normal vector V1 of the first operation surface 47 and the inserting direction D1 is in a range of 4°±2°. Note that, in other embodiments, the angle Aga may be 90°. "The first operation surface 47 is substantially perpendicular to the inserting direction D1" described above also includes not only a state in which the angle AGa formed by the first operation surface 47 and the inserting direction D1 is 90° but also a state in which the angle AGa is 84° or more and 90° or less.

As illustrated in FIG. 6, the top surface 43 and the bottom surface 44 face each other in the Z direction, which corresponds to the central axis direction of the central axis CA2. As illustrated in FIG. 7, the bottom surface 44 includes the insertion opening 446 into which the liquid introducing section 642 of the cartridge attachment section 6 is inserted and a supply section positioning section 448. The bottom surface 44 forms the lower-side surface of the cartridge 4 when the cartridge 4 is in the attachment completed state. The bottom surface 44 is a surface positioned on the back side in the rotational-attachment direction D2 with the back side of the cartridge attachment section 6 in the inserting direction D1 as the rotation fulcrum 698, that is, the tip end side in the rotational-attachment direction D2. In the attachment process, the supply section positioning section 448 receives the apparatus-side supply section positioning section 644 and positions the liquid supply section 442 with respect to the liquid introducing section 642. Specifically, in the supply section coupling process of the attachment process, the supply section positioning section 448 receives the apparatus-side supply section positioning section 644 and regulates movement of the supply section positioning section 448 in a direction intersecting the rotational-attachment direction D2 to thereby position the liquid supply section 442 with respect to the liquid introducing section 642. The supply section positioning section 448 is formed on the bottom surface 44 and is a portion recessed from the outer surface of the bottom surface 44.

As illustrated in FIG. 6, the top surface 43 is opposite to the bottom surface 44 in the Z direction, which corresponds to the central axis direction. The top surface 43 forms the upper-side surface of the cartridge 4 when the cartridge 4 is in the attachment completed state. In the inserted posture, the top surface 43 is positioned on the front side in the rotational-attachment direction D2, that is, the back side in the coupling terminating direction D3 opposite to the rotational-attachment direction D2. The top surface 43 couples the front surface 42 and the first operation surface 47. The top surface 43 includes a main surface 432, an inclined surface 433, and the second operation surface 435 coupled to the first operation surface 47. The main surface 432, the inclined surface 433, and the second operation surface 435 have a planar shape.

The main surface 432 is the largest surface of the three surfaces 431, 433, and 435. The main surface 432 extends from the front surface 42 in the detaching direction D4 opposite to the inserting direction D1. The main surface 432 is parallel to the inserting direction D1. The inclined surface 433 extends from the main surface 432 in the detaching direction D4. An end of the inclined surface 433 on the +Y direction side is coupled to the first operation surface 47. The inclined surface 433 is inclined with respect to the inserting direction D1 so as to be positioned inward of the cartridge main body 41, which corresponds to the bottom surface 44 side, toward the detaching direction D4 side, that is, toward the first operation surface 47. As illustrated in FIG. 8, for example, in the inserted posture and in side view, a second angle AG2 formed by the inclined surface 433 and the inserting direction D1 is in a range of 10° to 35° inclusive. The second operation surface 435 couples the inclined surface 433 and the first operation surface 47. The second operation surface 435 receives a second load FD2 in response to the user pressing the second operation surface 435 in the downward direction in the direction of gravity by which the cartridge 4 is moved in the rotational-attachment direction D2. The second load FD2 is applied substantially in the downward direction in the direction of gravity. The rotational-attachment direction D2 has a component in the downward direction in the direction of gravity. In the inserted posture, the second operation surface 435 is positioned on the downward direction side in the direction of gravity with respect to the main surface 432. In the inserted posture and in side view, a first angle AG1 formed by the second operation surface 435 and the inserting direction D1 is smaller than the second angle AG2. The first angle AG1 is, for example, 2° or less, and, in the present embodiment, is 0°. The second operation surface 435 is substantially perpendicular to the downward direction in the direction of gravity in the inserted posture and in side view. In this case, "substantially perpendicular to the downward direction in the direction of gravity" includes not only a state in which an angle formed by the second operation surface 435 and the downward direction in the direction of gravity is 90° but also a state in which the angle is in a range of 90°±2°. Moreover, as understood from the description above, in the inserted posture and in side view, the first angle AG1 formed by the second operation surface 435 and the inserting direction D1 is smaller than the angle AGa formed by the first operation surface 47 and the inserting direction D1. Note that the downward direction in the direction of gravity extends substantially in the same direction as the direction of the second load FD2. Moreover, a tangential direction of a rotation trajectory of the cartridge 4 passing through the second operation surface 435 in the rotational-attachment direction D2 substantially perpendicularly crosses the second operation surface 435 in side view. As illustrated in FIG. 6, the inclined surface 433 demarcates a first space SP1 on the upper side of the second operation surface 435.

As illustrated in FIG. 7, the first side surface 45 and the second side surface 46 face each other in the X direction, which corresponds to the width direction. The first side surface 45 and the second side surface 46 are parallel to the Y direction and the Z direction in the inserted posture. The first side surface 45 is a surface positioned on the +X direction side. The second side surface 46 is a surface positioned on the −X direction side. As illustrated in FIG. 7, the corner section 89 is provided in a corner portion in which the front surface 42 and the bottom surface 44 intersect each other. The corner section 89 includes a terminal arrangement section 90 having a shape recessed inward. The circuit substrate 50 is arranged in the terminal arrangement section 90.

As illustrated in FIG. 6, the cartridge 4 further includes a stepped surface 87 and an opposite surface 431. The stepped surface 87 is a surface formed by the adaptor 402. The stepped surface 87 is a surface that rises from an end of the bottom surface 44 on the +Y direction side, which corresponds to the detaching direction D4 side, to the top surface 43 side. As illustrated in FIG. 7, a cartridge engagement section 497 is formed on the stepped surface 87. The cartridge engagement section 497 is a portion recessed from the outer surface of the stepped surface 87. When an attachment engagement section 697 enters the cartridge engagement section 497 in the attachment completed state, the cartridge engagement section 497 engages the attachment engagement section 697. The engagement maintains the attachment completed state of the cartridge 4 with respect to the cartridge attachment section 6.

As illustrated in FIG. 6, the opposite surface 431 is a surface formed by the liquid containing body 401. The opposite surface 431 serves as the bottom surface of the liquid containing body 401. The opposite surface 431 is opposite to the second operation surface 435 in the central axis direction along the central axis CA2. The opposite surface 431 is positioned on the upward direction side in the direction of gravity with respect to the bottom surface 44. In other words, the opposite surface 431 is positioned between the second operation surface 435 and the bottom surface 44 in the central axis direction along the central axis CA2. This makes it possible to suppress an increase in the size of the cartridge main body 41, thus generating a second space SP2 on the lower side of the opposite surface 431, as illustrated in FIG. 6.

As illustrated in FIG. 6, a virtual rectangular parallelepiped, which is indicated by the dotted line, has a minimum volume to accommodate the cartridge main body 41, is a virtual rectangular parallelepiped VC. In this case, a first portion 47*a* of the first operation surface 47 other than an end 47*b* on the rotational-attachment direction D2 side and the second operation surface 435 are positioned within the virtual rectangular parallelepiped VC. The end 47*b* is a portion of the first operation surface 47 crossing the opposite surface 431. Since the first portion 47*a* and the second operation surface 435 are positioned within the virtual rectangular parallelepiped VC, it is possible to suppress an increase in the size of the cartridge main body 41. Moreover, a second portion 431*a* of the opposite surface 431 other than a coupled portion 431*b* coupled to the first operation surface 47 is positioned within the virtual rectangular parallelepiped VC. Since the second portion 431*a* is positioned within the virtual rectangular parallelepiped VC, it is possible to suppress an increase in the size of the cartridge main body 41.

A-4. Cartridge Attachment Process

Figure 9:
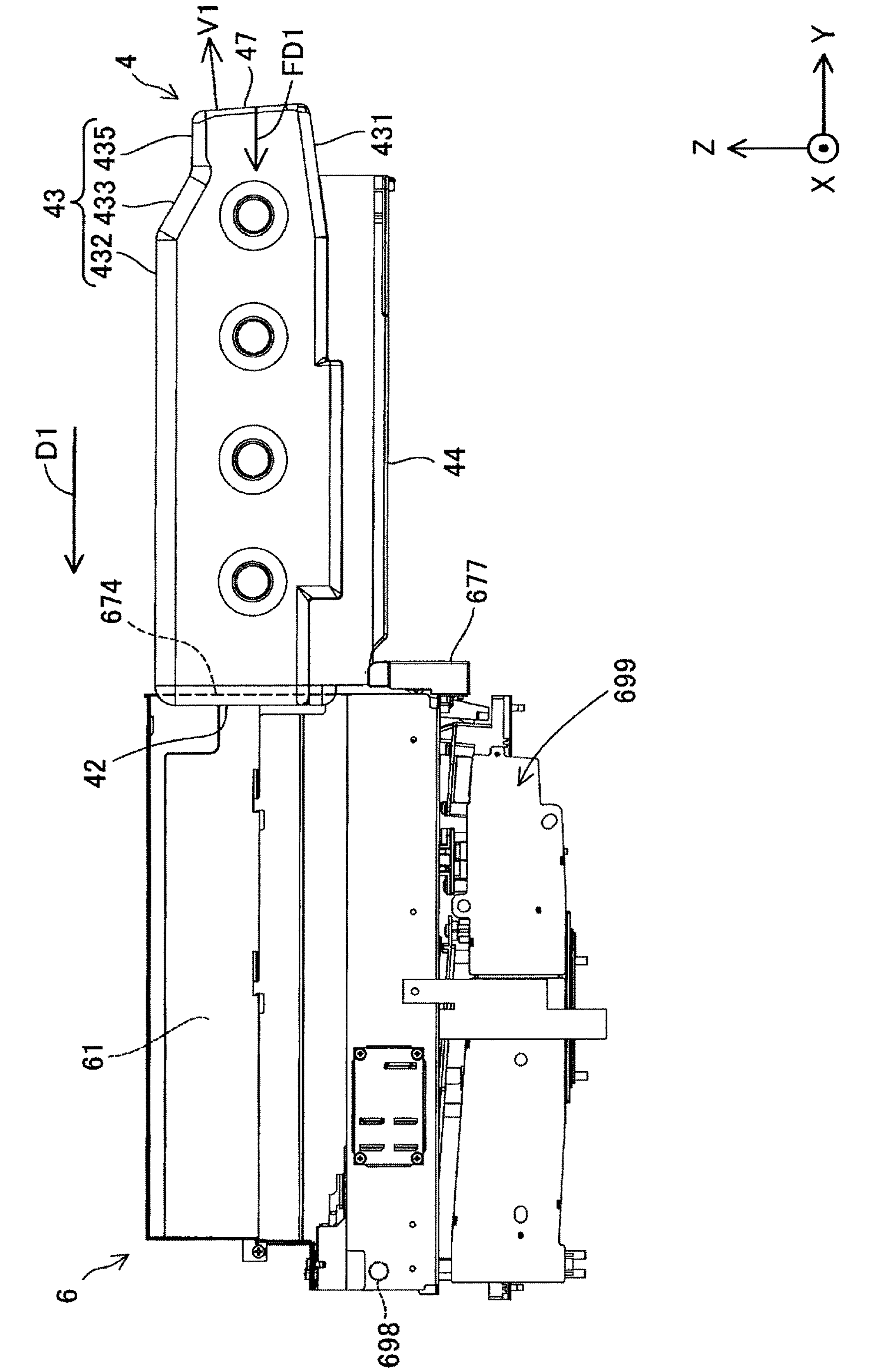
FIG. 9 is a first view for explaining a process of attaching the cartridge to the cartridge attachment section.
Figure 10:
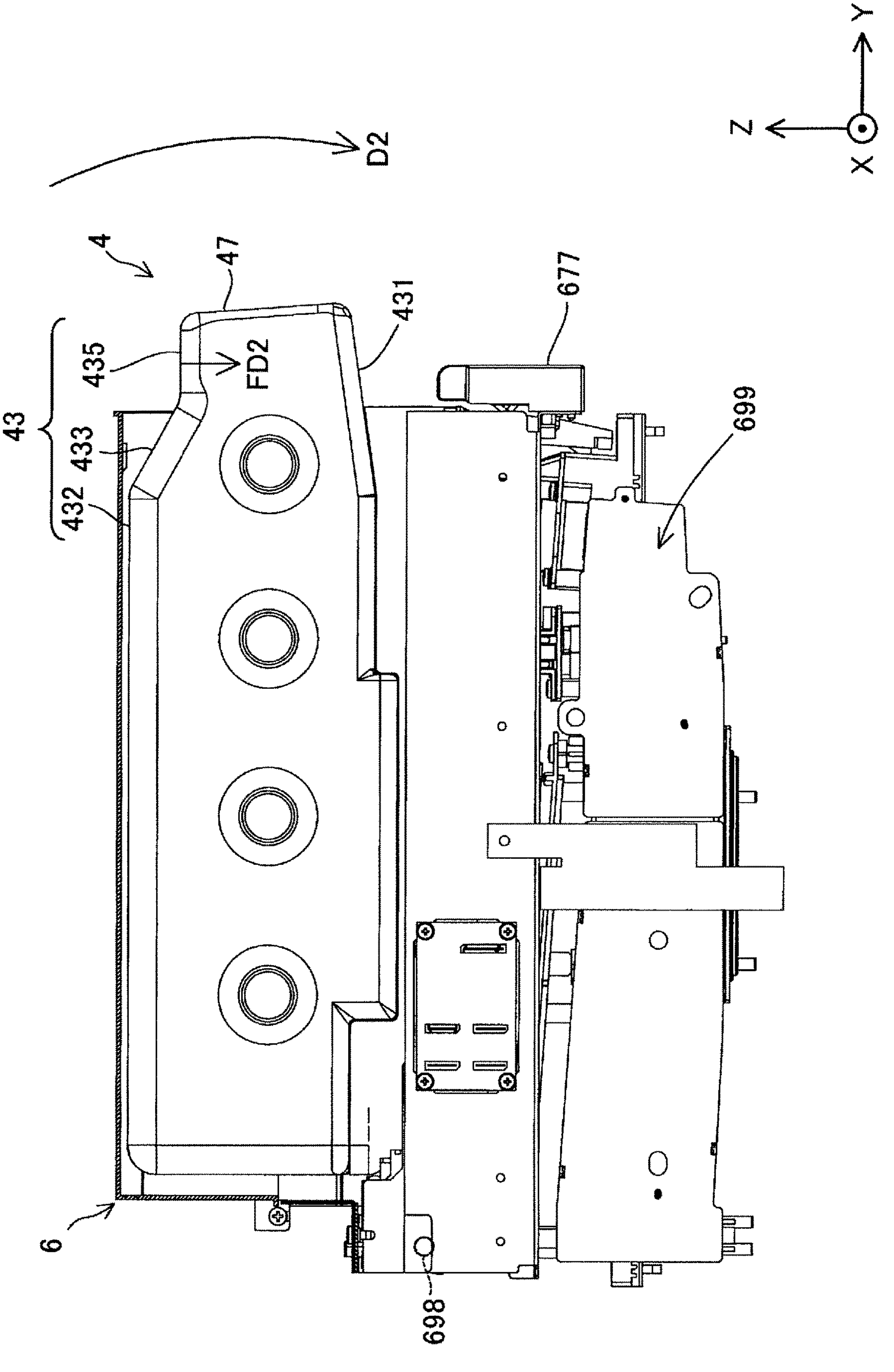
FIG. 10 is a second view for explaining the process of attaching the cartridge to the cartridge attachment section.
Figure 11:
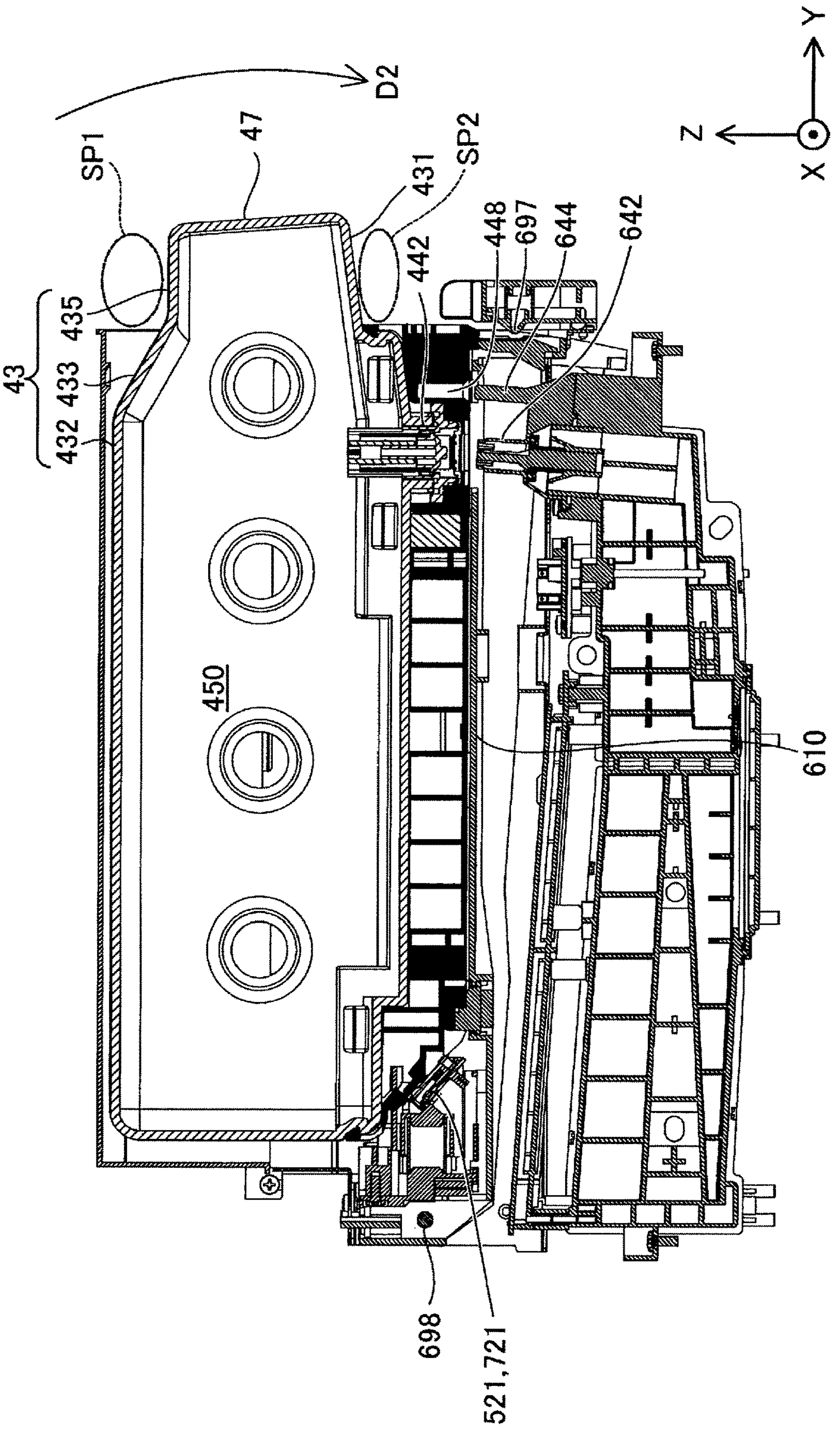
FIG. 11 is a sectional view of FIG. 10 along the YZ plane parallel to the Y direction and the Z direction.
Figure 12:
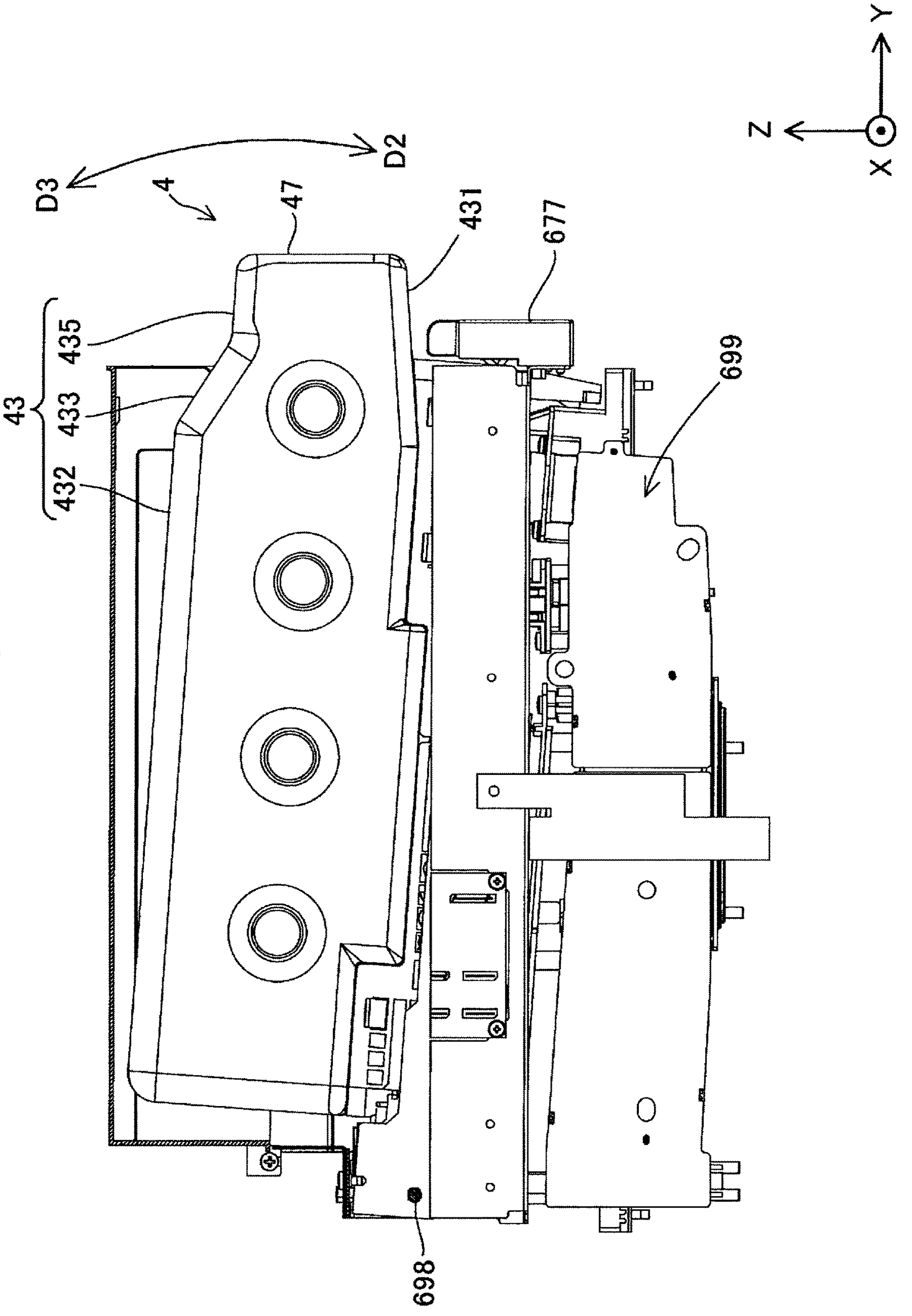
FIG. 12 is a third view for explaining the process of attaching the cartridge to the cartridge attachment section.
Figure 13:
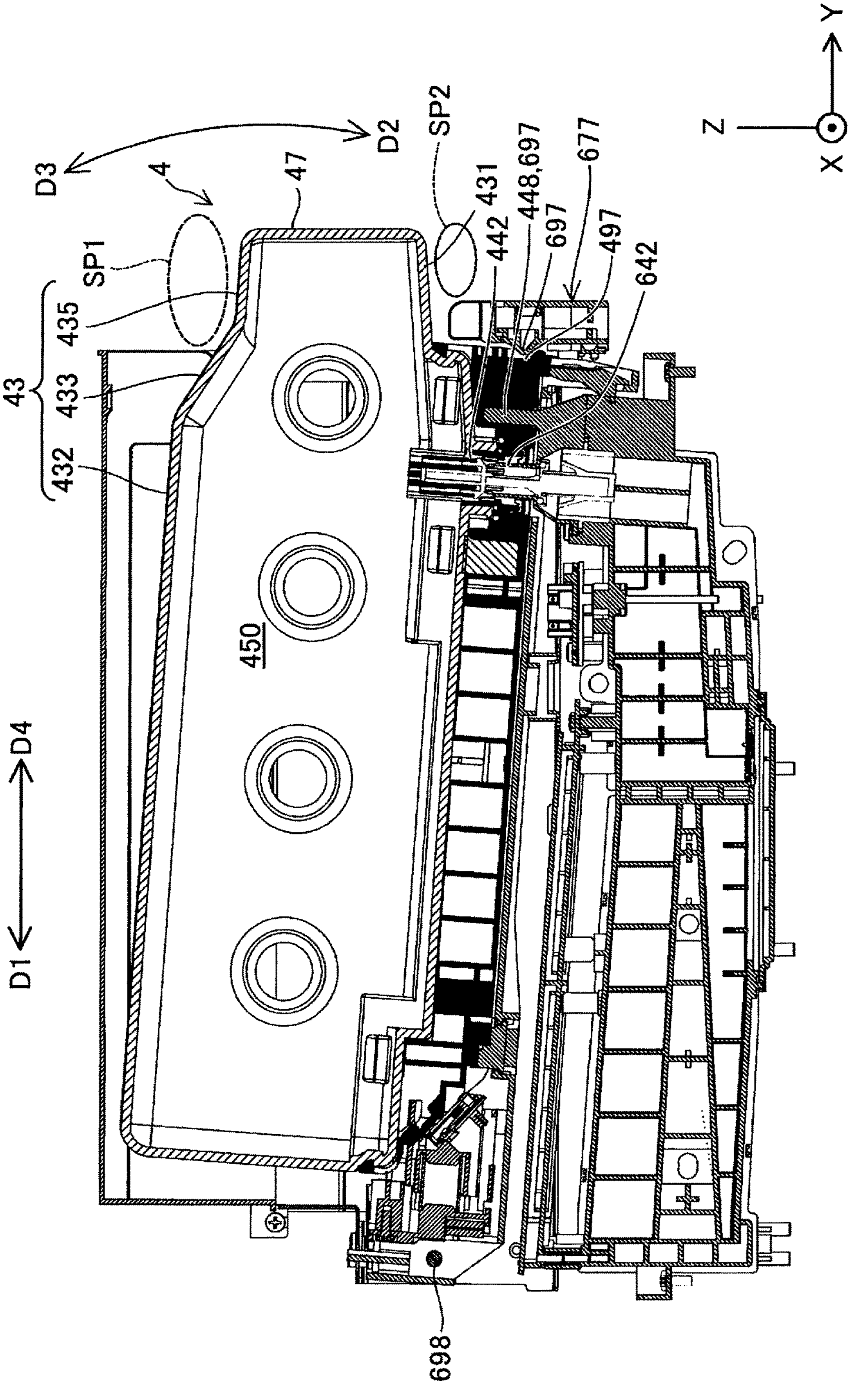
FIG. 13 is a sectional view of FIG. 12 along the YZ plane.

FIG. 9 is a first view for explaining a process of attaching the cartridge 4 to the cartridge attachment section 6. FIG. 10 is a second view for explaining the process of attaching the cartridge 4 to the cartridge attachment section 6. FIG. 11 is a sectional view of FIG. 10 along the YZ plane parallel to the Y direction and the Z direction. FIG. 12 is a third view for explaining the process of attaching the cartridge 4 to the cartridge attachment section 6. FIG. 13 is a sectional view of FIG. 12 along the YZ plane.

The terminal coupling process is performed by initially moving the cartridge 4 in the inserting direction D1 to a predetermined position at which a cartridge-side terminal 521 of the circuit substrate 50 comes into contact with an apparatus-side terminal 721 of the cartridge attachment section 6. In the terminal coupling process, the user pushes the first operation surface 47 in the inserting direction D1. The first operation surface 47 thereby receives the first load FD1 in the inserting direction D1. The first operation surface 47 extends from the second operation surface 435 to the side where the bottom surface 44 is located. Specifically, in the present embodiment, the first operation surface 47 is substantially perpendicular to the inserting direction D1 in the inserted posture of the cartridge 4 and in side view. That is, the direction of the normal vector V1 of the first operation surface 47 is substantially parallel to the inserting direction D1. This makes it possible to suppress the first load FD1 generated by the user pushing the first operation surface 47 in the inserting direction D1 from being distributed. Accordingly, the user is able to move the cartridge 4 in the inserting direction D1 by pushing the first operation surface 47 in the inserting direction D1 with a smaller force. That is, since the first load FD1 is able to be applied in a direction close to 90° with respect to the first operation surface 47, it is possible to suppress the first load FD1 from being distributed in a direction other than the inserting direction D1, thus enabling the user to move the cartridge 4 in the inserting direction D1 by pushing the first operation surface 47 in the inserting direction D1 with a smaller force. As a result, it is possible to suppress a degradation in operability of the cartridge 4 in the inserting direction D1.

As illustrated in FIGS. 10 and 11, the supply section coupling process is performed after the terminal coupling process is completed by moving the cartridge 4 in the inserting direction D1 to the predetermined position at which the cartridge-side terminal 521 comes into contact with the apparatus-side terminal 721. That is, the user pushes the second operation surface 435 in the downward direction in the direction of gravity to thereby rotationally move the cartridge 4 about the rotation fulcrum 698 in the rotational-attachment direction D2 having a component in the downward direction in the direction of gravity. Thus, as illustrated in FIG. 13, when the supply section positioning section 448 receives the apparatus-side supply section positioning section 644, the liquid supply section 442 starts to be positioned with respect to the liquid introducing section 642. Next, when the liquid supply section 442 is inserted into the liquid introducing section 642 to be coupled, the attachment of the cartridge 4 to the cartridge attachment section 6 is completed. Here, as illustrated in FIG. 8, in the inserted posture and in side view, the first angle AG1 formed by the second operation surface 435 and the inserting direction D1 is smaller than the second angle AG2 formed by the inclined surface 433 and the inserting direction D1. This makes it possible to make the angle formed by the second operation surface 435 and the downward direction in the direction of gravity close to 90° compared with an angle formed by the inclined surface 433 and the downward direction in the direction of gravity. Thus, since the second load FD2 is able to be applied in a direction close to 90° with respect to the second operation surface 435, it is possible to suppress the second load from being distributed in a direction other than the downward direction in the direction of gravity compared with a case in which the inclined surface 433 is pushed in the downward direction in the direction of gravity. This makes it possible to further reduce a force for pushing the second operation surface 435 in the downward direction in the direction of gravity to move the cartridge 4 in the rotational-attachment direction D2. Accordingly, it is possible to suppress a degradation in operability of the cartridge in the rotational-attachment direction D2 when the cartridge 4 is attached. In particular, in the present embodiment, in the inserted posture and in side view, the second operation surface 435 is substantially perpendicular to the downward direction in the direction of gravity. As a result, it is possible to suppress the second load applied to the second operation surface 435 from being distributed in the supply section coupling process, thus making it possible to further reduce a force for pushing the second operation surface 435 in the downward direction in the direction of gravity to move the cartridge 4 in the rotational-attachment direction D2. As described above, it is possible to suppress a degradation in operability for attaching the cartridge 4.

In the attachment completed state of the cartridge 4, the liquid supply section 442 of the cartridge 4 and the liquid introducing section 642 of the cartridge attachment section 6 are coupled to each other as illustrated in FIG. 13. Accordingly, the liquid stored in the liquid containing section 450 of the cartridge 4 is supplied to the liquid introducing section 642 via the liquid supply section 442. Moreover, in the present embodiment, while the liquid is supplied from the liquid supply section 442 to the liquid introducing section 642, air that accumulates in a liquid storage section 699 of the cartridge attachment section 6 forms air bubbles, and the air bubbles flow to the liquid containing section 450 by flowing through the liquid introducing section 642 and the liquid supply section 442. Gas-liquid exchange of the liquid containing section 450 is thus performed. Note that, in other embodiments, the cartridge 4 may include an air communication path that enables the liquid containing section 450 to communicate with the outside, and gas-liquid exchange may be performed via the air communication path. The air communication path is arranged at a position different from that of the liquid supply section 442 and is formed in, for example, a wall that forms the liquid containing section 450.

Moreover, in the attachment completed state of the cartridge 4, the cartridge engagement section 497 of the cartridge 4 engages the attachment engagement section 697 of the cartridge attachment section 6, and the attachment completed state is thereby retained. The attachment engagement section 697 is formed in the engagement forming body 677 positioned on the first apparatus wall 67 side of the cartridge attachment section 6.

When the cartridge 4 is detached from the cartridge attachment section 6, the user initially raises the first operation surface 47 side of the cartridge 4 to the upward direction side in the direction of gravity to thereby move the cartridge 4 in the coupling terminating direction D3, which has a component in the upward direction against the direction of gravity, with the rotation fulcrum 698 as the center. In the process of the movement, the attachment engagement section 697 constituted by a spring is moved by the cartridge 4, which terminates the engagement performed by the attachment engagement section 697 and the cartridge engagement section 497. After moving the cartridge 4 in the coupling terminating direction D3 until the cartridge 4 is brought into the inserted posture, the user holds the first operation surface 47 side of the cartridge 4 to move the cartridge 4 in the detaching direction D4. The cartridge 4 is thereby detached from the cartridge attachment section 6.

Here, as illustrated in FIG. 2, since the four cartridges 4C, 4M, 4Y, and 4K are arranged in the X direction, spaces between adjacent cartridges 4 are small. Thus, it is difficult to hold the side surfaces 45 and 46 of the cartridge 4 to move the cartridge 4 in the detaching direction D4 by holding the cartridge 4. On the other hand, as illustrated in FIGS. 11 and 13, in the cartridge 4, the inclined surface 433 demarcates the first space SP1 on the upper side of the second operation surface 435, and the stepped surface 87 demarcates the second space SP2 on the lower side of the opposite surface 431. As described below, the first space SP1 and the second space SP2 are able to improve operability for detaching the cartridge 4. For example, as illustrated in FIG. 13, since the second space SP2 is formed, the user is able to push the opposite surface 431 in the upward direction against the direction of gravity by inserting a hand into the second space SP2. Moreover, in the inserted posture illustrated in FIG. 11, since the first space SP1 and the second space SP2 are formed, the user is able to move the cartridge 4 in the detaching direction D4 by inserting a hand into the first space SP1 and the second space SP2 and holding the second operation surface 435 and the opposite surface 431.

According to the aforementioned embodiment, as illustrated in FIG. 6, the cartridge 4 includes the main surface 432 that constitutes the top surface 43 and the second operation surface 435 that constitutes the top surface 43 and is positioned on the downward direction side in the direction of gravity with respect to the main surface 432. This makes it possible to suppress an increase in the size of the outer shape of the cartridge 4 compared with a case in which the main surface 432 and the second operation surface 435 are at the same height. Moreover, according to the aforementioned embodiment, as illustrated in FIG. 8, the cartridge 4 includes the inclined surface 433 positioned inward toward the second operation surface 435. In other words, the cartridge 4 includes the inclined surface 433 that is inclined with respect to the inserting direction D1 so as to be positioned on the bottom surface 44 side toward the detaching direction D4 side. This also makes it possible to suppress an increase in the size of the outer shape of the cartridge 4. Suppressing an increase in the size of the outer shape of the cartridge 4 reduces the weight of the cartridge 4 and enables the user to easily hold the cartridge 4, thus making it possible to suppress a degradation in operability for the user to attach or detach the cartridge 4 to or from the printing apparatus 10. It is possible to suppress the first load FD1 applied to the first operation surface 47 and the second load FD2 applied to the second operation surface 435 at the time of attaching the cartridge 4 to the cartridge attachment section 6 from being distributed in a direction other than a direction in which the cartridge 4 is pushed. As a result, it is possible to suppress a degradation in operability in the process of attaching the cartridge 4.

B. Other Embodiments

B-1. Another Embodiment 1

The disclosure is not limited to an ink jet printer and an ink cartridge therefor and can also be applied to a cartridge attached to any printing apparatus that ejects a liquid other than ink. For example, the disclosure can be applied to various printing apparatuses as follows and cartridges therefor:

(1) an image recording apparatus such as a facsimile apparatus;

(2) a printing apparatus that ejects a coloring material used in manufacturing of a color filter for an image display apparatus such as a liquid crystal display;

(3) a printing apparatus that ejects an electrode material used to form electrodes of an organic EL (Electro Luminescence) display, a surface emitting display (Field Emission Display, FED), and the like;

(4) a printing apparatus that ejects a liquid containing a bioorganic substance used in manufacturing of biochips;

(5) a sample printing apparatus serving as a precision pipette;

(6) a printing apparatus for lubricating oil;

(7) a printing apparatus for a liquid resin;

(8) a printing apparatus that ejects lubricating oil in a pinpoint manner onto a precision instrument such as a clock or a camera;

(9) a printing apparatus that ejects a transparent liquid resin such as an ultraviolet curing liquid resin onto a substrate to form a hemispherical microlens (an optical lens) used in an optical communication element or the like;

(10) a printing apparatus that ejects an acid or alkaline etchant to perform etching of a substrate or the like; and

(11) a printing apparatus including a liquid ejecting head that ejects any other minute liquid droplets.

Note that the term "liquid droplets" refers to a state of liquid ejected from the printing apparatus, and examples thereof include a granular shape, a tear shape, and a thread-like trailing shape. Further, the term "liquid" here refers to any material that is able to be ejected by the printing apparatus. For example, "liquid" may be any material as long as it is a material in a state in which a substance is in a liquid phase, and examples thereof include a liquid-state material having high or low viscosity and a liquid-state material such as a sol, gel water, other inorganic solvents, an organic solvent, a solution, a liquid resin, and a liquid metal. Examples of the "liquid" further include, in addition to liquid as one state of a substance, materials in which particles of a functional material having solids such as pigments and metal particles are dissolved, dispersed, or mixed in a solvent. In addition, representative examples of liquid include ink as described in the embodiment described above, liquid crystal, and the like. Examples of the ink include various liquid compositions such as typical water-based ink, oil-based ink, gel ink, and hot-melt ink.

B-2. Another Embodiment 2

In the aforementioned embodiment, as illustrated in FIGS. 5 and 6, the main surface 432 and the inclined surface 433 of the cartridge 4 have a planar shape, but the shape is not limited to this. For example, the inclined surface 433 may have a curved surface shape that protrudes to the outside of the cartridge 4 or a curved surface shape that protrudes to the inside of the cartridge 4. Moreover, the inclined surface 433 may be constituted by a combination of a plurality of planes. The inclined surface 433 may be any surface that couples the main surface 432 and the second operation surface 435 and may be a surface extending in, for example, the downward direction in the direction of gravity.

C. Other Aspects

The disclosure is not limited to the embodiments described above and can be implemented in various configurations within a range not departing from the gist of the disclosure. For example, to solve some or all of the above-described problems or to achieve some or all of the above-described effects, technical features in the embodiments corresponding to technical features in the aspects described below can be replaced or combined as appropriate. The technical features can be omitted as appropriate unless the technical features are described as essential in the present specification.

(1) According to a first aspect of the disclosure, a cartridge detachably attached to a cartridge attachment section of a printing apparatus is provided. The cartridge includes a first operation surface that is positioned on a front side in an inserting direction which extends in a horizontal direction and in which the cartridge is inserted into the cartridge attachment section in an inserted posture in which the cartridge is inserted into the cartridge attachment section, the first operation surface being pushed in the inserting direction to receive a first load for moving the cartridge in the inserting direction, a main surface that constitutes a top surface positioned on a side of an upward direction in a direction of gravity in the inserted posture, and a second operation surface that constitutes the top surface in the inserted posture and is positioned on a side of a downward direction in the direction of gravity with respect to the main surface, the second operation surface being pushed in the downward direction in the direction of gravity to receive a second load for moving the cartridge in a rotational-attachment direction having a component in the downward direction in the direction of gravity, in which, in side view in which the cartridge is viewed in a width direction orthogonal to the inserting direction and the downward direction in the direction of gravity in the inserted posture, an angle formed by the second operation surface and the inserting direction is smaller than an angle formed by the first operation surface and the inserting direction. According to this aspect, since the second operation surface is positioned on the side of the downward direction in the direction of gravity with respect to the main surface, it is possible to suppress an increase in the size of an outer shape of the cartridge. This makes it possible to suppress a degradation in operability for the user to attach or detach the cartridge to or from the printing apparatus. Moreover, in the cartridge, the angle formed by the second operation surface and the inserting direction is smaller than the angle formed by the first operation surface and the inserting direction. This makes it possible to make the angle formed by the second operation surface and the downward direction in the direction of gravity close to 90° compared with the angle formed by the first operation surface and the downward direction in the direction of gravity. Thus, since the second load is able to be applied in a direction close to 90° with respect to the second operation surface, it is possible to suppress the second load from being distributed. This makes it possible to further reduce a force for pushing the second operation surface in the downward direction in the direction of gravity to move the cartridge in the rotational-attachment direction. Accordingly, it is possible to suppress a degradation in operability of the cartridge in the rotational-attachment direction when the cartridge is attached.

(2) In the aforementioned aspect, a bottom surface including an insertion opening into which a liquid introducing section of the cartridge attachment section is inserted may be further provided, and the first operation surface may extend from the second operation surface to a side where the bottom surface is located. According to this aspect, since the first operation surface extends from the second operation surface to the side where the bottom surface is located, the first load is able to be applied in a direction close to 90° with respect to the first operation surface, thus making it possible to suppress the first load from being distributed. This makes it possible to move the cartridge in the inserting direction by pushing the first operation surface in the inserting direction with a smaller force. As a result, it is possible to suppress a degradation in operability of the cartridge in the inserting direction when the cartridge is attached.

(3) In the aforementioned aspect, a cartridge main body that forms a contour and includes the first operation surface and the second operation surface may be further included, and a first portion of the first operation surface other than an end on a side of the rotational-attachment direction and the second operation surface may be positioned within a virtual rectangular parallelepiped that has a minimum volume to accommodate the cartridge main body. According to this aspect, since the first portion of the first operation surface and the second operation surface are positioned within the virtual rectangular parallelepiped, it is possible to suppress an increase in the size of the cartridge main body.

(4) In the aforementioned aspect, the second operation surface may be coupled to the first operation surface, the cartridge may further include an opposite surface that is opposite to the second operation surface and is coupled to the first operation surface, and a second portion of the opposite surface other than a coupled portion coupled to the first operation surface may be positioned within the virtual rectangular parallelepiped. According to this aspect, since the second portion of the opposite surface is positioned within the virtual rectangular parallelepiped, it is possible to suppress an increase in the size of the cartridge main body.

(5) In the aforementioned aspect, in the inserted posture and in the side view, the first operation surface may be substantially perpendicular to the inserting direction, and the second operation surface may be substantially perpendicular to the downward direction in the direction of gravity. According to this aspect, since the first load applied to the first operation surface is able to be suppressed from being distributed, it is possible to further reduce a force for pushing the first operation surface to move the cartridge in the inserting direction. Moreover, according to this aspect, since the second load applied to the second operation surface is able to be suppressed from being distributed, it is possible to further reduce a force for pushing the second operation surface in the downward direction in the direction of gravity to move the cartridge in the rotational-attachment direction. As described above, it is possible to suppress a degradation in operability for attaching the cartridge.

(6) According to a second aspect of the disclosure, a cartridge detachably attached to a cartridge attachment section of a printing apparatus is provided. The cartridge includes a liquid containing section that stores a liquid, a liquid supply section that communicates with the liquid containing section and includes a central axis, a front surface positioned on a back side in an inserting direction in which the cartridge is inserted into the cartridge attachment section at a predetermined position of the cartridge attachment section and which is orthogonal to a central axis direction extending along the central axis, a first operation surface that is opposite to the front surface in the inserting direction and receives a first load for moving the cartridge in the inserting direction, a bottom surface that includes an insertion opening into which a liquid introducing section of the cartridge attachment section is inserted and that is positioned on a back side in a rotational-attachment direction with a back side of the cartridge attachment section in the inserting direction as a rotation fulcrum, the rotational-attachment direction having a component in a downward direction in a direction of gravity, and a top surface that is opposite to the bottom surface in the central axis direction and couples the front surface and the first operation surface, in which the top surface includes a main surface that extends from the front surface in a detaching direction opposite to the inserting direction and a second operation surface that is positioned on a side of the bottom surface with respect to the main surface and receives a second load for moving the cartridge in the rotational-attachment direction, the second load being generated when the second operation surface is pushed in the downward direction in the direction of gravity, and in side view in which the cartridge is viewed in a width direction orthogonal to the inserting direction and the downward direction in the direction of gravity in an inserted posture in which the cartridge is inserted into the cartridge attachment section, an angle formed by the second operation surface and the inserting direction is smaller than an angle formed by the one operation surface and the inserting direction. According to this aspect, since the second operation surface is positioned on the side of the downward direction in the direction of gravity with respect to the main surface, it is possible to suppress an increase in the size of the outer shape of the cartridge. This makes it possible to suppress a degradation in operability for the user to attach or detach the cartridge to or from the printing apparatus. Moreover, in the cartridge, the angle formed by the second operation surface and the inserting direction is smaller than the angle formed by the first operation surface and the inserting direction. This makes it possible to make the angle formed by the second operation surface and the downward direction in the direction of gravity close to 90° compared with the angle formed by the first operation surface and the downward direction in the direction of gravity. Thus, since the second load is able to be applied in a direction close to 90° with respect to the second operation surface, it is possible to suppress the second load from being distributed. It is possible to move the cartridge in the rotational-attachment direction by pushing the second operation surface in the downward direction in the direction of gravity with a smaller force. Accordingly, it is possible to suppress a degradation in operability of the cartridge in the rotational-attachment direction when the cartridge is attached.

(7) In the aforementioned aspect, an opposite surface that is opposite to the second operation surface may be further included, and, in the central axis direction, the opposite surface may be positioned between the second operation surface and the bottom surface. According to this aspect, it is possible to suppress an increase in the size of the cartridge main body.

(8) In the aforementioned aspect, the top surface may further include an inclined surface that extends from the main surface to a side of the detaching direction and that is inclined with respect to the inserting direction so as to be positioned on a side of the bottom surface toward the detaching direction, and, in the inserted posture and in the side view, a first angle formed by the second operation surface and the inserting direction may be smaller than a second angle formed by the inclined surface and the inserting direction. According to this aspect, since the cartridge includes the inclined surface positioned on the side of the bottom surface toward the second operation surface, it is possible to suppress an increase in the size of the outer shape of the cartridge. This makes it possible to suppress a degradation in operability for the user to attach or detach the cartridge to or from the printing apparatus. Moreover, in the cartridge, the first angle formed by the second operation surface and the inserting direction is smaller than the second angle formed by the inclined surface and the inserting direction. This makes it possible to make the angle formed by the second operation surface and the downward direction in the direction of gravity close to 90° compared with the angle formed by the inclined surface and the downward direction in the direction of gravity. Thus, since the second load is able to be applied in a direction close to 90° with respect to the second operation surface, it is possible to suppress the second load from being distributed compared with a case in which the inclined surface is pushed in the downward direction in the direction of gravity. It is possible to further reduce a force for pushing the second operation surface in the downward direction in the direction of gravity to move the cartridge in the rotational-attachment direction. Accordingly, it is possible to suppress a degradation in operability of the cartridge in the rotational-attachment direction when the cartridge is attached.

(9) According to a third aspect of the disclosure, a cartridge detachably attached to a cartridge attachment section of a printing apparatus is provided. Attachment of the cartridge to the cartridge attachment section is completed when the cartridge is moved in an inserting direction, which extends in a horizontal direction, to be inserted into the cartridge attachment section at a predetermined position of the cartridge attachment section and is then rotationally moved in a rotational-attachment direction with a back side of the cartridge attachment section in the inserting direction as a rotation fulcrum, the rotational-attachment direction having a component in a downward direction in a direction of gravity. The cartridge includes a first operation surface that is positioned on a front side in the inserting direction in an inserted posture in which the cartridge is inserted into the cartridge attachment section and that is pushed in the inserting direction to receive a first load for moving the cartridge in the inserting direction, a second operation surface that is positioned on a front side in the rotational-attachment direction in the inserted posture and pushed in the downward direction in the direction of gravity to receive a second load for moving the cartridge in the rotational-attachment direction, and an inclined surface that is positioned on a front side in the rotational-attachment direction in the inserted posture, is inclined with respect to the inserting direction so as to be positioned inward toward the second operation surface, and is coupled to the second operation surface, and in side view in which the cartridge is viewed in a width direction orthogonal to the inserting direction and the downward direction in the direction of gravity in the inserted posture, a first angle formed by the second operation surface and the inserting direction is smaller than a second angle formed by the inclined surface and the inserting direction. According to this aspect, since the cartridge includes the inclined surface positioned inward toward the second operation surface, it is possible to suppress an increase in the size of the outer shape of the cartridge. This makes it possible to suppress a degradation in operability for the user to attach or detach the cartridge to or from the printing apparatus. Moreover, in the cartridge, the first angle formed by the second operation surface and the inserting direction is smaller than the second angle formed by the inclined surface and the inserting direction. This makes it possible to make the angle formed by the second operation surface and the downward direction in the direction of gravity close to 90° compared with the angle formed by the inclined surface and the downward direction in the direction of gravity. Thus, since the second load is able to be applied in a direction close to 90° with respect to the second operation surface, it is possible to suppress the second load from being distributed compared with a case in which the inclined surface is pushed in the downward direction in the direction of gravity. It is possible to further reduce a force for pushing the second operation surface in the downward direction in the direction of gravity to move the cartridge in the rotational-attachment direction. Accordingly, it is possible to suppress a degradation in operability of the cartridge in the rotational-attachment direction when the cartridge is attached.

The disclosure is able to be implemented in an aspect of a manufacturing method of a cartridge, a printing system including a cartridge and a printing apparatus, and the like in addition to the above-described aspects.

REFERENCE SIGNS LIST

1 printing system
2 printing sheet
4, 4C, 4M, 4Y, 4K cartridge
4A first-type cartridge
4B second-type cartridge
6 cartridge attachment section
8 cap member
10 printing apparatus
13 cover for replacement
15 operation button
20 carriage
22 ejecting head
24 tube
30 driving mechanism

31 control section
32 timing belt
34 driving motor
41 cartridge main body
42 front surface
43 top surface
44 bottom surface
45 first side surface
46 second side surface
47 first operation surface
47*a* first portion
47*b* end
50 circuit substrate
61 accommodating chamber
61C, 61M, 61Y, 61K slot
62 second apparatus wall
63 apparatus top wall
64 apparatus bottom wall
65 first apparatus side wall
66 second apparatus side wall
67 first apparatus wall
70 apparatus-side terminal section
87 stepped surface
89 corner section
90 terminal arrangement section
401 liquid containing body
402 adaptor
431 opposite surface
431*a* second portion
431*b* coupled portion
432 main surface
433 inclined surface
435 second operation surface
442 liquid supply section
442*a* supply section tip end
446 insertion opening
448 supply section positioning section
450 liquid containing section
497 cartridge engagement section
521 cartridge-side terminal
602 apparatus guiding section
602*a* first apparatus guiding section
602*b* second apparatus guiding section
610 supporting member
611 first supporting side wall
612 second supporting side wall
613 main wall
614 apparatus opening
642 liquid introducing section
642*b* tip end
644 apparatus-side supply section positioning section
644*b* other end
674 insertion/removal opening
677 engagement forming body
697 attachment engagement section
698 rotation fulcrum
699 liquid storage section
721 apparatus-side terminal
831 supply section arrangement section
AG1 first angle
AG2 second angle
AGa angle
CA1 central axis
CA2 central axis
D1 inserting direction
D2 rotational-attachment direction
D3 coupling terminating direction
D4 detaching direction
FD1 first load
FD2 second load
SP1 first space
SP2 second space
V1 normal vector
VC virtual rectangular parallelepiped

The invention claimed is:

1. A cartridge detachably attached to a cartridge attachment section of a printing apparatus, the cartridge comprising:

a first operation surface that is positioned on a front side in an inserting direction which extends in a horizontal direction and in which the cartridge is inserted into the cartridge attachment section in an inserted posture in which the cartridge is inserted into the cartridge attachment section, the first operation surface being pushed in the inserting direction to receive a first load for moving the cartridge in the inserting direction;

a main surface that constitutes a top surface positioned on a side of an upward direction in a direction of gravity in the inserted posture; and a second operation surface that constitutes the top surface in the inserted posture and is positioned on a side of a downward direction in the direction of gravity with respect to the main surface, the second operation surface being pushed in the downward direction in the direction of gravity to receive a second load for moving the cartridge in a rotational-attachment direction having a component in the downward direction in the direction of gravity, wherein in side view in which the cartridge is viewed in a width direction orthogonal to the inserting direction and the downward direction in the direction of gravity in the inserted posture, an angle formed by the second operation surface and the inserting direction is smaller than an angle formed by the first operation surface and the inserting direction.

2. The cartridge according to claim 1, further comprising a bottom surface including an insertion opening into which a liquid introducing section of the cartridge attachment section is inserted, wherein the first operation surface extends from the second operation surface to a side where the bottom surface is located.

3. The cartridge according to claim 1, further comprising a cartridge main body that forms a contour and includes the first operation surface and the second operation surface, wherein a first portion of the first operation surface other than an end on a side of the rotational-attachment direction and the second operation surface are positioned within a virtual rectangular parallelepiped that has a minimum volume to accommodate the cartridge main body.

4. The cartridge according to claim 3, wherein the second operation surface is coupled to the first operation surface, the cartridge further includes an opposite surface that is opposite to the second operation surface and is coupled to the first operation surface, and a second portion of the opposite surface other than a coupled portion coupled to the first operation surface is positioned within the virtual rectangular parallelepiped.

5. The cartridge according to any one of claim 1, wherein in the inserted posture and in the side view, the first operation surface is substantially perpendicular to the inserting direction, and the second operation surface is substantially perpendicular to the downward direction in the direction of gravity.

6. A cartridge detachably attached to a cartridge attachment section of a printing apparatus, the cartridge comprising:

a liquid containing section that stores a liquid;

a liquid supply section that communicates with the liquid containing section and includes a central axis;

a front surface positioned on a back side in an inserting direction in which the cartridge is inserted into the cartridge attachment section at a predetermined position of the cartridge attachment section and which is orthogonal to a central axis direction extending along the central axis;

a first operation surface that is opposite to the front surface in the inserting direction and receives a first load for moving the cartridge in the inserting direction;

a bottom surface that includes an insertion opening into which a liquid introducing section of the cartridge attachment section is inserted and that is positioned on a back side in a rotational-attachment direction with a back side of the cartridge attachment section in the inserting direction as a rotation fulcrum, the rotational-attachment direction having a component in a downward direction in a direction of gravity; and a top surface that is opposite to the bottom surface in the central axis direction and couples the front surface and the first operation surface, wherein the top surface includes a main surface that extends from the front surface in a detaching direction opposite to the inserting direction and a second operation surface that is positioned on a side of the bottom surface with respect to the main surface and receives a second load for moving the cartridge in the rotational-attachment direction, the second load being generated when the second operation surface is pushed in the downward direction in the direction of gravity, and in side view in which the cartridge is viewed in a width direction orthogonal to the inserting direction and the downward direction in the direction of gravity in an inserted posture in which the cartridge is inserted into the cartridge attachment section, an angle formed by the second operation surface and the inserting direction is smaller than an angle formed by the one operation surface and the inserting direction.

7. The cartridge according to claim 6, further comprising an opposite surface that is opposite to the second operation surface, wherein in the central axis direction, the opposite surface is positioned between the second operation surface and the bottom surface.

8. The cartridge according to claim 6, wherein the top surface further includes an inclined surface that extends from the main surface to a side of the detaching direction and that is inclined with respect to the inserting direction so as to be positioned on a side of the bottom surface toward the detaching direction, and in the inserted posture and in the side view, a first angle formed by the second operation surface and the inserting direction is smaller than a second angle formed by the inclined surface and the inserting direction.

9. A cartridge detachably attached to a cartridge attachment section of a printing apparatus, wherein attachment of the cartridge to the cartridge attachment section is completed when the cartridge is moved in an inserting direction, which extends in a horizontal direction, to be inserted into the cartridge attachment section at a predetermined position of the cartridge attachment section and is then rotationally moved in a rotational-attachment direction with a back side of the cartridge attachment section in the inserting direction as a rotation fulcrum, the rotational-attachment direction having a component in a downward direction in a direction of gravity, the cartridge includes a first operation surface that is positioned on a front side in the inserting direction in an inserted posture in which the cartridge is inserted into the cartridge attachment section and that is pushed in the inserting direction to receive a first load for moving the cartridge in the inserting direction, a second operation surface that is positioned on a front side in the rotational-attachment direction in the inserted posture and pushed in the downward direction in the direction of gravity to receive a second load for moving the cartridge in the rotational-attachment direction, and an inclined surface that is positioned on a front side in the rotational-attachment direction in the inserted posture, is inclined with respect to the inserting direction so as to be positioned inward toward the second operation surface, and is coupled to the second operation surface, and in side view in which the cartridge is viewed in a width direction orthogonal to the inserting direction and the downward direction in the direction of gravity in the inserted posture, a first angle formed by the second operation surface and the inserting direction is smaller than a second angle formed by the inclined surface and the inserting direction.

* * * * *